United States Patent
McGavran et al.

(10) Patent No.: US 10,352,716 B2
(45) Date of Patent: Jul. 16, 2019

(54) NAVIGATION PEEK AHEAD AND BEHIND IN A NAVIGATION APPLICATION

(71) Applicant: Apple Inc., Cupertino, CA (US)

(72) Inventors: Christine B. McGavran, Pacifica, CA (US); Bradford A. Moore, San Francisco, CA (US); Christopher D. Moore, San Francisco, CA (US); Harold O. Habeck, Mountain View, CA (US); Marcel van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/466,485

(22) Filed: Mar. 22, 2017

(65) Prior Publication Data
US 2017/0254663 A1 Sep. 7, 2017

Related U.S. Application Data

(63) Continuation of application No. 15/207,476, filed on Jul. 11, 2016, now Pat. No. 9,631,945, which is a (Continued)

(51) Int. Cl.
  *G01C 21/36* (2006.01)
  *G06F 3/0481* (2013.01)
  (Continued)

(52) U.S. Cl.
  CPC ..... *G01C 21/3664* (2013.01); *G01C 21/3632* (2013.01); *G06F 3/0481* (2013.01);
  (Continued)

(58) Field of Classification Search
  CPC .............. G01C 21/3632; G06F 3/0481; G06F 3/04845; G06F 3/0485; G06F 3/04883
  (Continued)

(56) References Cited

U.S. PATENT DOCUMENTS 4,914,605 A  4/1990 Loughmiller, Jr. et al.
5,459,667 A  10/1995 Odagaki et al.
(Continued)

FOREIGN PATENT DOCUMENTS

DE  102008036748 A1  10/2009
EP  1626250 A1  2/2006
(Continued)

OTHER PUBLICATIONS

Ruhs, Chris, "My Favorite Android Apps: Maps," Jun. 24, 2011, 1 page, available at http://www.youtube.com/watch?v=v2aRkLkLT3s.
(Continued)

*Primary Examiner* — Maceeh Anwari
(74) *Attorney, Agent, or Firm* — Invoke

(57) ABSTRACT

A method of providing a sequence of turn-by-turn navigation instructions on a device traversing a route is provided. Each turn-by-turn navigation instruction is associated with a location on the route. As the device traverses along the route, the method displays a turn-by-turn navigation instruction associated with a current location of the device. The method receives a touch input through a touch input interface of the device while displaying a first turn-by-turn navigation instruction and a first map region that displays the current location and a first location associated with the first turn-by-turn navigation instruction. In response to receiving the touch input, the method displays a second turn-by-turn navigation instruction and a second map region that displays a second location associated with the second turn-by-turn navigation instruction. Without receiving additional input, the method automatically returns to the display of the first turn-by-turn navigation instruction and the first map region.

21 Claims, 18 Drawing Sheets

Related U.S. Application Data continuation of application No. 14/055,811, filed on Oct. 16, 2013, now Pat. No. 9,404,766.

(60) Provisional application No. 61/832,838, filed on Jun. 8, 2013.

(51) Int. Cl.
  *G06F 3/0484* (2013.01)
  *G06F 3/0485* (2013.01)
  *G06F 3/0488* (2013.01)

(52) U.S. Cl.
  CPC ........ *G06F 3/0485* (2013.01); *G06F 3/04845* (2013.01); *G06F 3/04883* (2013.01)

(58) Field of Classification Search
  USPC .......................................................... 701/532
  See application file for complete search history.

(56) References Cited

U.S. PATENT DOCUMENTS

| | | | |
|---|---|---|---|
| 5,629,854 | A | 5/1997 | Schulte |
| 5,654,892 | A | 8/1997 | Fujii et al. |
| 6,321,158 | B1 | 11/2001 | DeLorme et al. |
| 6,693,564 | B2 | 2/2004 | Niitsuma |
| 7,480,565 | B2 | 1/2009 | Ikeuchi et al. |
| 7,698,063 | B2 | 4/2010 | Kim |
| 8,355,862 | B2 | 1/2013 | Blumenberg |
| 8,428,871 | B1 | 4/2013 | Matthews et al. |
| 8,464,182 | B2 | 6/2013 | Blumenberg et al. |
| 8,589,075 | B1 | 11/2013 | Jones |
| 8,606,516 | B2 | 12/2013 | Vertelney et al. |
| 8,607,167 | B2 | 12/2013 | Matas et al. |
| 8,612,151 | B2 | 12/2013 | Krzysztof |
| 8,639,654 | B2 | 1/2014 | Vervaet et al. |
| 8,983,778 | B2 | 3/2015 | McCarthy |
| 2004/0024524 | A1 | 2/2004 | Miyazawa |
| 2005/0049786 | A1 | 3/2005 | Odachi et al. |
| 2005/0273251 | A1 | 12/2005 | Nix et al. |
| 2005/0273252 | A1 | 12/2005 | Nix et al. |
| 2006/0041372 | A1 | 2/2006 | Kubota et al. |
| 2006/0195257 | A1 | 8/2006 | Nakamura |
| 2006/0217879 | A1 | 9/2006 | Ikeuchi et al. |
| 2007/0150179 | A1 | 6/2007 | Pinkus et al. |
| 2007/0276597 | A1 | 11/2007 | Kato et al. |
| 2008/0208450 | A1 | 8/2008 | Katzer |
| 2008/0228393 | A1 | 9/2008 | Geelen et al. |
| 2009/0037094 | A1 | 2/2009 | Schmidt |
| 2009/0063041 | A1 | 3/2009 | Hirose et al. |
| 2009/0063048 | A1 | 3/2009 | Tsuji |
| 2009/0171561 | A1 | 7/2009 | Geelen |
| 2009/0171575 | A1 | 7/2009 | Kim et al. |
| 2009/0171578 | A1 | 7/2009 | Kim et al. |
| 2009/0182497 | A1 | 7/2009 | Hagiwara |
| 2009/0187335 | A1 | 7/2009 | Muhlfelder et al. |
| 2009/0216434 | A1 | 8/2009 | Panganiban et al. |
| 2010/0045704 | A1 | 2/2010 | Kim |
| 2010/0153010 | A1 | 6/2010 | Huang |
| 2010/0324816 | A1 | 12/2010 | Highstrom et al. |
| 2011/0098918 | A1 | 4/2011 | Siliski et al. |
| 2011/0285717 | A1 | 11/2011 | Schmidt et al. |
| 2012/0041674 | A1 | 2/2012 | Katzer |
| 2012/0143504 | A1 | 6/2012 | Kalai et al. |
| 2012/0303263 | A1 | 11/2012 | Alam et al. |
| 2012/0303268 | A1* | 11/2012 | Su ..................... G01C 21/3632 701/428 |
| 2013/0035853 | A1 | 2/2013 | Savvopoulos |
| 2013/0191020 | A1 | 7/2013 | Emani et al. |
| 2013/0325339 | A1 | 12/2013 | McCarthy |
| 2013/0325342 | A1 | 12/2013 | Pylappan et al. |
| 2013/0328861 | A1 | 12/2013 | Arikan et al. |
| 2013/0328915 | A1 | 12/2013 | Arikan et al. |
| 2013/0328916 | A1 | 12/2013 | Arikan et al. |
| 2013/0328924 | A1 | 12/2013 | Arikan et al. |
| 2014/0365122 | A1 | 12/2014 | McGavran et al. |
| 2016/0320201 | A1 | 11/2016 | McGavran et al. |

FOREIGN PATENT DOCUMENTS

| | | |
|---|---|---|
| EP | 2080985 A2 | 7/2009 |
| EP | 2672223 A1 | 12/2013 |
| EP | 2672225 A2 | 12/2013 |
| EP | 2672226 A2 | 12/2013 |
| WO | 86/02764 A1 | 5/1986 |
| WO | 2007/101711 A2 | 9/2007 |
| WO | 2009/115070 A1 | 9/2009 |
| WO | 2011/076989 A1 | 6/2011 |
| WO | 2011/146141 A1 | 11/2011 |
| WO | 2012/034581 A1 | 3/2012 |
| WO | 2013/184348 A2 | 12/2013 |
| WO | 2013/184444 A2 | 12/2013 |
| WO | 2013/184449 A2 | 12/2013 |

OTHER PUBLICATIONS

Portions of prosecution history of U.S. Appl. No. 14/055,811, dated Jul. 7, 2016, McGavran, Christine B., et al.

Lawrence, Steve, "Review: Sygic Mobile Maps 2009," Jul. 23, 2009, 4 pages, available at http://www.iphonewzealand.co.nz/2009/all/review-sygic-mobile-maps-2009/.

Dube, Ryan, "Use Google Maps Navigation for Turn-By-Turn GPS [Android]", available at http://www.makeuseof.com/tag/google-maps-navigation-turnbyturn-gps-androi- d/, Jun. 24, 2010, 7 pages.

Author Unknown, "Mazda: Navigation System—Owner's Manual", available at http://download.tomtom.com/open/manuals/mazda/nva-sd8110/Full.sub.-Manua- l.sub.--EN.pdf, Jan. 1, 2009, 159 pages.

Author Unknown, "Google Maps Voice Navigation in Singapore," software2tech, Jul. 20, 2011, 1 page, available at http://www.youtube.com/watch?v=7B9JN7BkvME.

Author Unknown, "Garmin. nuvi 1100/1200/1300/1400 series owner's manual," Jan. 2011, 72 pages, Garmin Corporation, No. 68, Jangshu 2.sup.nd Road, Sijhih, Taipei County, Taiwan.

Author Unknown, "Blaupunkt chooses NNG navigation software for new aftermarket product," May 24, 2011, 2 pages, available at http://telematicsnews.info/2011/05/24/blaupunkt-chooses-nng-navigation-so- ftware-for-new-aftermarket-product.sub.-my2241/.

Author Unknown, "Android 2.3.4 User's Guide", May 20, 2011, pp. 1-384, Google, Inc.

Author Unknown, "'Tough & Go' Owner's Manual," Jul. 2011, 218 pages, Toyota, United Kingdom.

\* cited by examiner

NAVIGATION PEEK AHEAD AND BEHIND IN A NAVIGATION APPLICATION

CLAIM OF BENEFIT TO PRIOR APPLICATIONS

This is a continuation of U.S. patent application Ser. No. 15/207,476, filed Jul. 11, 2016, which is a continuation of U.S. patent application Ser. No. 14/055,811, filed Oct. 16, 2013, now U.S. Pat. No. 9,404,764, which claims priority of U.S. Provisional Application 61/832,838, filed Jun. 8, 2013. The entries of these applications are incorporated herein by reference.

BACKGROUND

Many map-based applications available today are designed for a variety of different devices (e.g., desktops, laptops, tablet devices, smartphones, handheld global positioning system (GPS) receivers, etc.) and for various different purposes (e.g., navigation, browsing, sports, etc.). Most of these applications generate displays of a map based on map data that describes relative locations of streets, highways, points of interest, etc., in the map. Some map-based applications provide a navigation feature, which provides the user with turn-by-turn instructions to a destination. Most of these applications, however, do not have sophisticated features that today's demanding users wish to have in their map-based applications.

BRIEF SUMMARY

Some embodiments of the invention provide a navigation application that allows a user to peek ahead a future turn-by-turn navigation instruction and a turn-by-turn map view of a location that corresponds to the future navigation instruction while the navigation application guides the user through a route. In some embodiments, the navigation application displays in a display area a different turn-by-turn navigation instruction and a different turn-by-turn map view of a different location that corresponds to the different turn-by-turn navigation instruction according to the user's current position that changes as the user moves along the route. The navigation application allows the user to slide out a currently displayed turn-by-turn navigation instruction from the display area to slide in a future turn-by-turn navigation instruction. As the future turn-by-turn navigation instruction slides in, the navigation application displays in the display area a location that corresponds to the future turn-by-turn navigation instruction.

In some embodiments, the navigation application provides one turn-by-turn navigation instruction at a time for the user to follow. The navigation application of some embodiments presents the turn-by-turn navigation instruction in a banner that resembles a road sign, by overlaying the banner on a map view that shows a region of the map in which the user is currently positioned. As the user makes progress towards the destination of the route, the navigation application updates the map view to show different regions of the map in which the user's changing current position falls. This map view for providing the current turn-by-turn navigation instruction is referred to as a navigation view. The navigation application displays a map view in a display area of the navigation application.

The navigation application of some embodiments allows the user to peek ahead the future navigation instructions before the user advances on the route to the regions of the map that correspond to the future navigation instructions. Specifically, the navigation application allows the user to slide out the banner that displays the current navigation instruction from the display area of the navigation application. As the banner for the current navigation instruction slides out of the display area, the navigation application slides another banner that displays the next navigation instruction into the display area. In addition, the navigation application modifies the map view to show the location for the next navigation instruction in the display area without dropping out the current position of the user from the display area. The location for the next navigation instruction is a location in the map where the user is to make a maneuver (e.g., a left turn) according to the next navigation instruction (e.g., "Turn left onto Main Street.").

When the user slides out the banner for the next navigation instruction, the navigation application slides in another banner that displays a navigation instruction that is after the next navigation instruction in the sequence of navigation instructions for the route. The navigation application then changes the map view further to display the location for this navigation instruction and the location for the next navigation instruction as well as the current position of the user in the display area. In this manner, the navigation application allows the user to peek ahead the future navigation instructions up to the last navigation instruction for the route. The modified map view that shows the locations of the future navigation instructions and the current position of the user is referred to as a peek view.

For displaying a peek view, the navigation application of some embodiments make a direction, from the current location of the user to the location for a particular future navigation instruction, point to the top side of the screen of the device when a banner for the particular future navigation instruction is displayed in the screen. In order to make the direction to point to the top side of the screen while displaying both the current location and the location for the particular future navigation instruction in the display area, the navigation application zooms out, pans and/or rotates the map.

The navigation application of some embodiments also allows the user to peek behind the past navigation instructions. Specifically, the navigation application slides in a banner that displays the previous navigation instruction when the user slides out the banner that displays the current navigation instruction in a different direction than the direction in which the user slides out the banner to peek ahead the future navigation instructions. As the banner for the previous navigation instruction slides in, the navigation application modifies the map view to show the location for the previous navigation instruction in the screen without dropping out the current position of the user from the display area. In this manner, the navigation application of some embodiments allows the user to peek behind the past navigation instructions up to the first navigation instruction of the route.

Different embodiments allow the user to slide out a banner from the display area differently. For instance, the navigation application of some embodiments allows the user to swipe the screen horizontally (e.g., to the left or to the right) to slide the banner out of the display area. Alternatively or conjunctively, the navigation application of some embodiments allows the user to swipe the screen vertically (e.g., swipe up or swipe down) to slide out the banner to either side out of the display area. In some embodiments, the navigation interprets a swipe as a horizontal swipe even when the swipe is not perfectly parallel to a horizontal line of the display area, as long as the swipe makes an angle with the horizontal line that is within a threshold angle. Likewise, the navigation interprets a swipe as a vertical swipe even when the swipe is not perfectly parallel to a vertical line of the display area as long as the swipe makes an angle with the vertical line that is within the threshold angle.

In some embodiments, the navigation application takes the horizontal swipes to move the banners when the navigation application presents navigation instructions for a walking route. The navigation application takes vertical swipes to move the banner when the navigation application presents navigation instructions for a driving route.

In some embodiments, the navigation application reverts back to a navigation view from a peek view when the touch, which has caused the navigation application to modify the map view to display the peek view, is off the display area. For instance, when the user touches the display area with a finger and moves the finger on the display area without lifting up the finger, the navigation application of some embodiments moves the banner for the current navigation instruction accordingly and also modifies the map view to display the peek view. However, the navigation application of some of these embodiments reverts back to the navigation view as soon as the touch is not maintained with the display area.

In other embodiments, the navigation application keeps displaying the peek view even when the touch is not maintained with the display area. In these embodiments, the navigation application reverts back to the navigation view from the peek view when the user swipes the screen again to cause the navigation application to slide in the banner that displays the current navigation instruction back to the screen.

In some of these embodiments, the navigation application automatically reverts back to the navigation view from the peek view without receiving any swipes. For instance, in some embodiments, the navigation application keeps track of the current position of the user while the navigation application is displaying the peek view. When the current position of the user advances to a location that is within a threshold distance from the location for the current navigation instruction, the navigation reverts back to the navigation view for the current navigation instruction. Alternatively or conjunctively, the navigation application of some embodiments keeps track of the time since the navigation application started displaying the peek view and reverts to the navigation view when a defined period of time elapses since the start of the peek view display.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
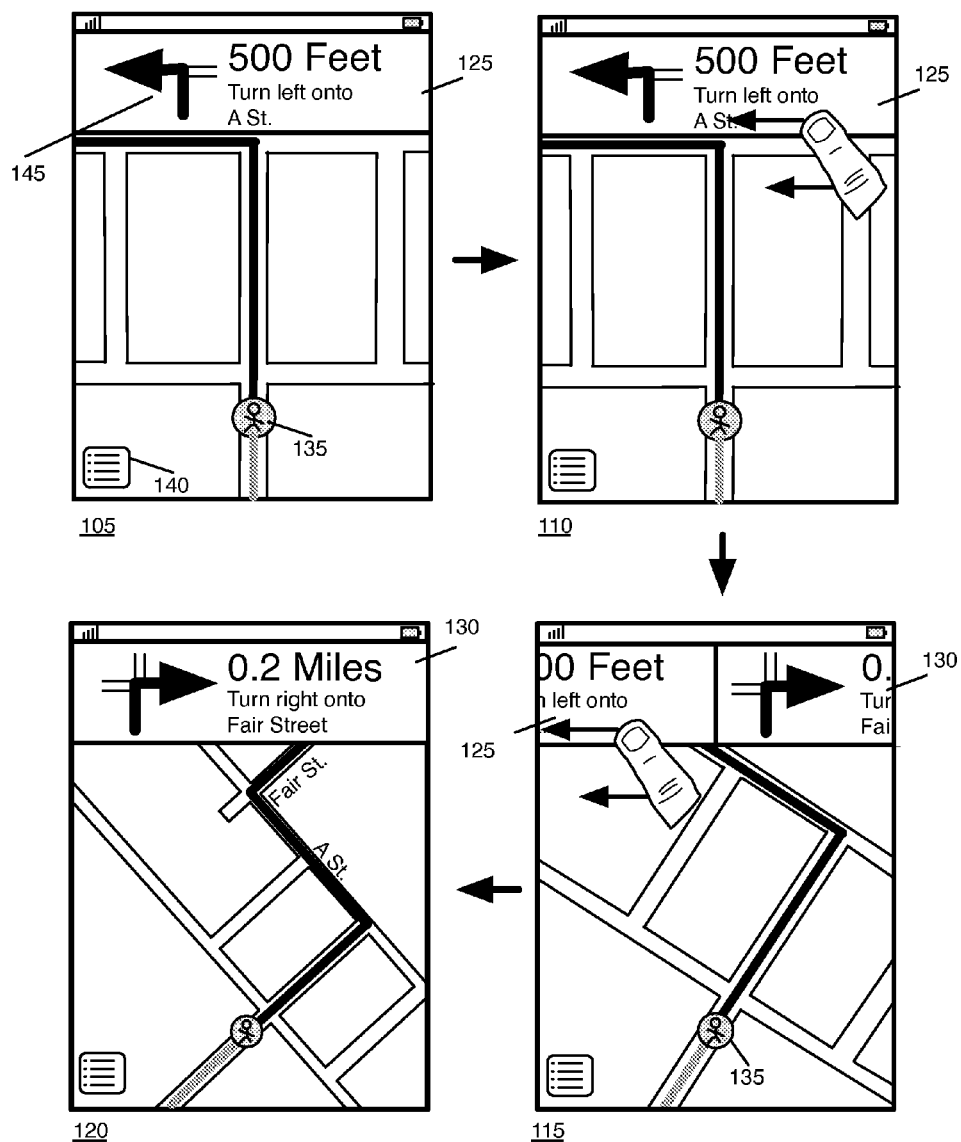
FIG. 1 illustrates an example of an navigation application that switches from the driving mode to the pedestrian mode and then switches back to the driving mode.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

The navigation application of some embodiments is part of an integrated mapping application that includes several useful modalities, including location browsing, map searching, route identifying and route navigating operations. This integrated application (referred to above and below as the mapping application, the navigation application, or the integrated application) in some embodiments is defined to be executed by a device that has a touch-sensitive screen and/or a near-touch sensitive screen that displays the output of the application. In some embodiments, this device has a multi-touch interface for allowing a user to provide touch and gestural inputs through the screen to interact with the application. Examples of such devices are smartphones (e.g., iPhone® sold by Apple Inc., phones operating the Android® operating system, phones operating the Windows® operating system, etc.) tablet computers (e.g., iPad® sold by Apple Inc., tablets operating the Android® operating system, tablets operating the Windows® operating system, etc.), laptop computers, desktop computers, etc.

The navigation application of some embodiments provides multiple different views during navigation and smooth transitions between these views. In some embodiments, examples of such views include a two-dimensional (2D) turn-by-turn view, a three-dimensional (3D) turn-by-turn view, and an overall route view. The application in some embodiments generates the turn-by-turn views from a perspective rendering position within a 3D navigation scene that the device renders. This perspective rendering position in some embodiments is adjustable and can be viewed as a virtual camera that can capture the 3D navigation scene from a variety of different perspectives (e.g., from a variety of different positions and orientations). Accordingly, in some embodiments, the turn-by-turn navigation is an animated rendering of navigated route that is rendered from the vantage point of a virtual camera that traverses along the direction of the route based on the traversal direction and speed of the user carrying the device, which in some embodiments is captured by directional data (e.g., GPS data, triangulated cell-tower data, etc.) associated with the device.

Some embodiments provide a navigation application that allows a user to peek ahead/behind to future/previous navigation instructions for a route being navigated by the user. For example, the navigation application may provide a zooming function, which leaves the user's current position on the screen of the device, but allows the user to see future navigation instructions. The navigation application may maintain the zoomed out view, slowly zooming in as the user approaches the locations for the current navigation instruction. Alternatively, the peek view may be a temporary view that automatically reverts to the navigation view after a defined period of time.

The navigation application may provide a similar function for peeking at previous directions without re-orienting the map. For example, the navigation application may display a previous navigation instruction by moving the current location further up the screen to fit both the location for the previous navigation instruction and the location for the current navigation instruction on the screen.

The navigation application of different embodiments differently obtains a route between a starting location and an ending location. In some embodiments, the navigation application computes the route locally at the device on which the navigation application runs. Alternatively or conjunctively, the navigation application sends the information about the starting and ending locations to a remote server, which computes the route and returns the computed route back to the device and the navigation application. In some embodiments, a compute route includes a set of navigation instructions that guides the user traveling on the route from the starting location to the ending location. A navigation instruction is also referred to as a maneuvering instruction as it guides the user how to maneuver (e.g., make a turn) at a junction or juncture of roads on a route.

The navigation application of some embodiments differently presents, in different navigation modes, the turn-by-turn navigation instructions and the turn-by-turn map views of a route. In some embodiments, the different navigation modes include the driving mode and the pedestrian mode. In the driving mode, the navigation application of some embodiments tailors the presentation of the navigation instructions and the map views for a user who is driving a car to navigate the route. In the pedestrian mode, the navigation application of some embodiments tailors the presentation of the navigation instructions and the map views for a user who is walking along the route to the destination.

For instance, the navigation application of some embodiments presents the map view in three-dimension (3D) when the navigation application is in the driving mode. When in the pedestrian mode, the navigation application provides the map views in two-dimension (2D). Moreover, the navigation application of some embodiments presents the map views with higher detailed constructs (e.g., trees, foliage, sidewalks, medians, lanes of roads, road asphalt, cross walks, etc.) that provide a more realistic and richer 3D view when the navigation application is in the driving mode. The navigation application shows lower detailed constructs that provide a simpler 2D view when the navigation application is in the pedestrian mode.

Several detailed embodiments are described in the sections below. Section I describes the navigation application of some embodiments in the pedestrian mode that allows the user to peek ahead and behind the navigation instructions of a walking route. Next, Section II describes the navigation application of some embodiments in the driving mode that allows the user to peek ahead and behind the navigation instructions of a driving route. Section III follows with a description of example software architecture of the navigation application of some embodiments. Section IV describes architecture of a mobile computing device of some embodiments and an electronic system that implements some embodiments of the invention. Finally, Section V describes a map service operating environment according to some embodiments.

I. Peeking Ahead and Behind in the Pedestrian Mode

A. Peeking Ahead

FIG. 1 illustrates an example of the navigation application that allows a user to peek ahead the next navigation instructions for a route being navigated by the user. Specifically, this figure illustrates in terms of four stages 105-120 that the navigation application displays a location that corresponds to the next navigation instruction in response to the user's swiping on a banner 125 that displays the current navigation instruction. This figure illustrates a screen of a device 100 that displays user interface (UI) pages of the navigation application, including a display area of the navigation application. The device 100 is a device on which the navigation application executes.

In some embodiments, each of the navigation instructions for the route corresponds to a location and instructs the user how to maneuver (e.g., make a left turn) at the location in order to guide the user to follow along the route. When a user travels a route using the navigation application, the navigation application displays a current navigation instruction and a map view that shows a region of a map in which the current position of the user is located (i.e., the current position of the device that the user navigating the route).

Different embodiments use different techniques to identify the current position of the device. For instance, in some embodiments, the navigation application uses GPS coordinates received through the device's GPS receiver. The navigation application may also receive the current position information from a remote server (not shown) that employs Wi-Fi Positioning System (WPS).

In some embodiments, the navigation application displays a navigation instruction in a banner that resembles a road sign. The navigation application in some embodiments places the banner on the top portion of the displayed map view. The navigation application allows the user to slide out the banner and slide in another banner that displays the next navigation instruction. As the banner displaying the current navigation instruction slides out and the other banner displaying the next navigation instruction slides in, the navigation application of some embodiments changes the zoom level, pans the map view, and/or rotates the map view. The navigation application of some embodiments performs the zooming, panning and/or rotating in such a way that the navigation application displays both the current position of the device (i.e., the current position of the user) and the location that corresponds to the next navigation instruction in the screen of the device together.

At the first stage 105, the navigation application displays a top-down view of a map that shows a route being traveled by the user. The navigation application changes the view by showing different areas along the route as the user makes progress to the destination of the route. In some embodiments, the navigation application displays a current position indicator (e.g., a puck 135) in the map view to indicate the current position of the user in the region of the map being displayed. In some embodiments, the navigation application keeps the current position indicator at a position that is just below the center of the screen. That is, the current position indicator 135 is stationary with respect to the sides of the screen even if the displayed map view changes as the user moves on the route.

At the first stage 105, the direction of travel by the user is pointing the top side of the screen because the navigation application of some embodiments updates the map view such that the current direction of the travel by the user is vertically pointing up in the map view as the user moves on the route. However, when the user is peeking ahead to see the location for the next navigation instruction, the navigation application of some embodiments rotates the map view so that the direction (i.e., a vector) from the current position of the user to the location for the next navigation instruction points to the top side of the screen. The location for the next navigation instruction is the end of the next section of the route, which starts at the location for the current navigation instruction.

At the first stage 105, the navigation application displays the banner 125. In some embodiments, a banner displaying a navigation instruction also displays other information in addition to the navigation instruction. For instance, the banner 125 displays the remaining distance to the location for the current navigation instruction and also a directional indicator 145 as shown at the first stage 105. The navigation application in some embodiments also displays a list control 140, which when selected displays the navigation instructions for the route in a list format.

The route being traveled is partially shown in the map view. In some embodiments, the navigation application differently renders the portion of the route that has not been navigated and the portion of the route that has been navigated in order to visually distinguish these portions. For instance, as shown at the first stage 105, the portion of the route that has not been navigated is rendered in black and the portion of the route that has been navigated is rendered in grey.

The second stage 110 shows that the user starts moving the banner 125 to the left side of the screen (i.e., to the left side of the display area displayed on the screen). In some embodiments, the navigation application allows the user to move a banner by dragging the banner to the direction to which the user wishes to move the banner. At the second stage 110, the user places the finger on the banner 125 and starts to move the finger to the left side of the screen while maintaining the touch with the screen to drag the banner to the left. (The user does not have to place the finger on the screen when the screen is a near-touch sensitive screen and as long as the device senses as a "touch").

The third stage 115 shows that the user's finger has dragged the banner 125 to the left and another banner 130 that displays the next navigation instruction has slid in from the right side of the screen by chasing the banner 125. The navigation application allows the user to drag a banner partially out of the screen. In some embodiments, the amount of the rotation of the map view the navigation application makes is proportional to the size of the portion of the banner that has slid out. For instance, when it takes a 90-degree clockwise rotation of the map view to make the direction from the current position of the user to the location of the next navigation instruction point to the top side of the screen, the navigation application rotates the map view by 30 degrees clockwise when a third of the banner slides out of the screen to the left. As the banner 125 is not completely slid out of the screen at this stage 110, the navigation application has not fully rotated the map view to have the direction to point to the top side of the screen.

Moreover, the amount of zooming that the navigation application of some embodiments performs is also proportional to the size of the portion of the banner that has slid out of the screen. For instance, when it takes to zoom out the map view by 50 percent to display both the current location and the location for the next navigation instruction, the navigation application zooms out the map view by 25 percent when a half of the banner slides out of the screen. At the third stage 115, because the banner 125 is not completely slid out of the screen, the navigation application has not fully zoomed out the map view display both the current position of the user and the location for the next navigation instruction.

The navigation application may also pan the map view as the map view is rotated or zoomed out, in order to display on the screen a new region of the map that includes both the current position of the device and the location for the next navigation instruction. In some embodiments, the navigation application keeps the current position indicator stationary with respect to the sides of the screen while the map view is being zoomed out, rotated and/or panned.

In some embodiments, the map view shows a region of a map from a viewpoint of a virtual camera that is positioned perpendicularly to the ground (the map) and has a point of focus in the middle of the region of the map being displayed. In these embodiments, the navigation application performs zooming in and out by changing the camera's distance from the ground. The navigation performs rotating by rotating the camera about the point of focus. The navigation performs panning by moving the point of focus to another location of the map. In these embodiments, the navigation application translates the movement of the banner being slid into the movement of the camera.

As shown at the third stage 115, the navigation application of some embodiments does not rotate the puck 135 as the navigation application rotates the map view. That is, the person displayed in the puck 135 keeps its uprightness with respect to the bottom side of the screen. In other embodiments, however, the navigation application keeps the uprightness of the puck with respect to the direction of the travel. Therefore, the puck would rotate as the roads rotate.

The fourth stage 120 shows that the user has completely dragged the banner 125 out of the screen and the banner 130 displaying the next navigation instruction is fully displayed in the screen. As shown, the navigation application has fully zoomed out to a zoom level at which the map view display both the current position of the user and the location for the next navigation instruction. The location for the next navigation instruction in this example is the junction of the A Street and the Fair Street at which the user is to turn right according to the next navigation instruction displayed in the banner 130. The navigation application has also rotated the map view such that the direction from the current position of the user to the location for the next navigation instruction points to the top side of the screen. The puck 135 is at the same position with respect to the sides of the screen.

In the example illustrated in FIG. 1, the user has peeked ahead to view the location for the next navigation instruction only. However, the navigation application of some embodiments allows the user to peek ahead to view as many navigation instructions as possible up to the last navigation instruction of the route being traveled. In such cases, the navigation application performs zooming, rotating and panning to display the current location and all the locations for all the future navigation instructions in the screen together.

For instance, when the user slides out a banner displaying the current navigation instruction and then slides out another banner displaying the first next navigation instruction, the navigation application of some embodiments slides in a third banner that displays the second next navigation instruction in the sequence of navigation instructions for the route. When the banner displaying the current navigation instruction slides out, the navigation application rotates the map view to have the vector from the current position of the user to the location for the first next navigation instruction to point to the top side of the screen. The navigation application then further rotates the map view to have the vector from the current position of the user to the location for the second next navigation instruction to point to the top side of the screen.

Likewise, the navigation application zooms out to display both the current position of the user and the location for the first next navigation instruction. The navigation application then zooms out the map view even further to display the current position of the user, the location for the first next navigation instruction, and the location for the second next navigation instruction together in the screen. The navigation application also pans the map view as necessary to display the current position of the user and the locations for the first and second navigation instruction together.

In some embodiments, the navigation application treats the current position of the user and the locations for the future navigation instructions as a group of points of interests (POIs) to be displayed together on the map. The navigation application of these embodiments zooms, rotates and/or pans the map view to display this group of POIs within the screen of the device by moving the virtual camera. Displaying a group of POIs by moving the virtual camera is described further in U.S. patent application Ser. No. 13/632,040, entitled "Virtual Camera for 3D Maps," filed Sep. 30, 2012, now issued as U.S. Pat. No. 9,269,178. U.S. patent application Ser. No. 13/632,040 is incorporated herein by reference.

The way the map view is displayed at the first stage 105 (e.g., the current direction of the travel pointing up to the top side of the screen, the current position indicator being maintained at a position below the center of the screen, etc.) is referred to as "navigation view" above and below. The way the map view is displayed at the fourth stage 120 (e.g., the vector from the current location of the user to the location for the displayed navigation instruction pointing the top side of the screen, the current position indicator and the locations for the future navigation instructions being displayed in the screen together, etc.) is referred to as "peek view." The way the map view is displayed at the third stage 115 (e.g., zooming, panning, and/or rotating are not fully completed to be the peek view) is referred to as a "partial" peek view.

B. Bouncing Back to Navigation View

Figure 2:
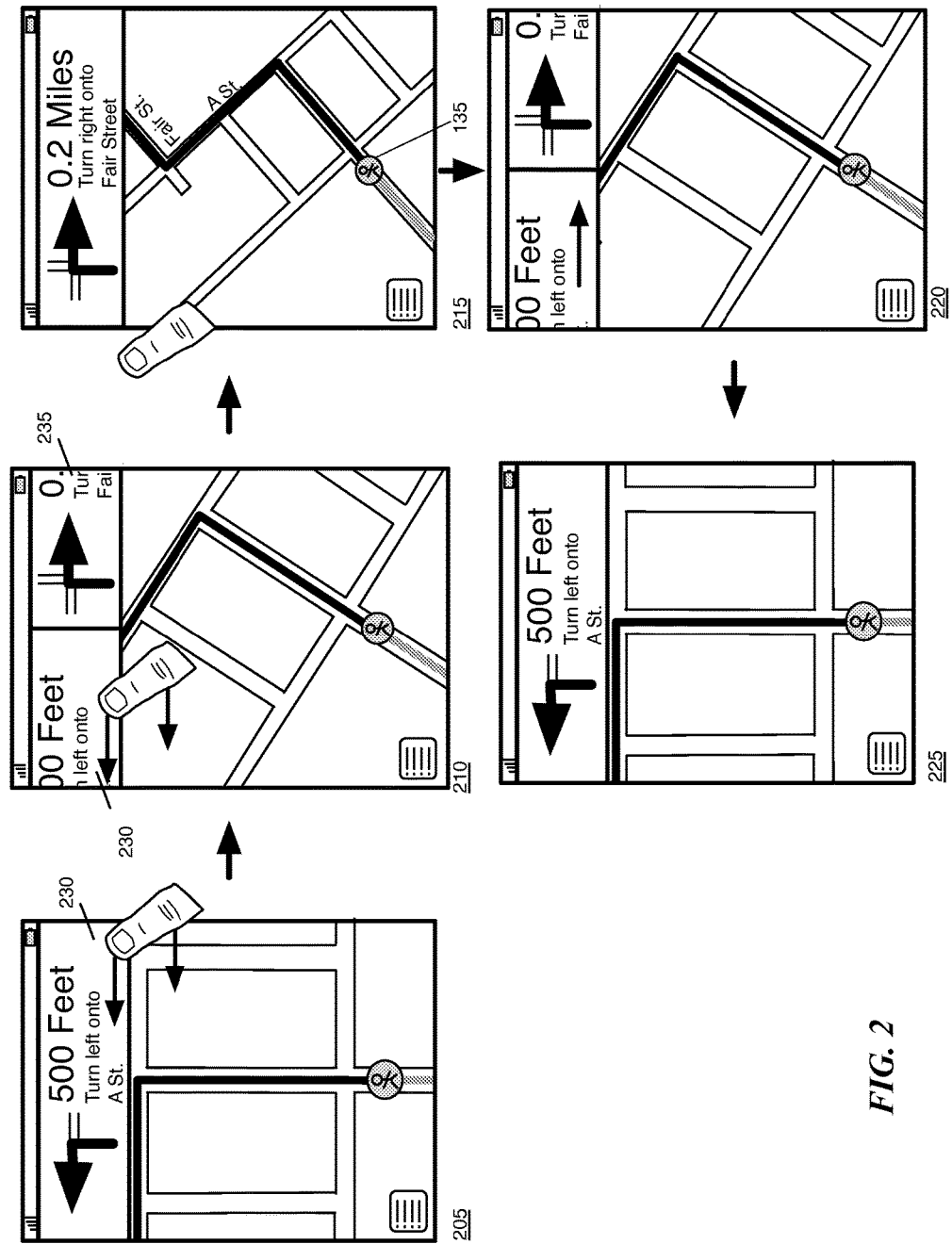
FIG. 2 illustrates that the navigation application of some embodiments bounces a banner back to its original position.

FIG. 2 illustrates that the navigation application of some embodiments bounces a banner back to its original position when the touch on the banner that dragged the banner out of the screen of a device is not maintained with the screen. This figure illustrates the bouncing back operation of the navigation application in terms of five stages 205-225.

At the first stage 205, the navigation application displays a banner 230 that displays the current navigation instruction of a route being traveled by a user. The user starts dragging the banner 230 to the left side of the screen.

The second stage 210 shows that the user has dragged the banner 230 about a half way out of the screen to the left. As a result, another banner 235 showing the next navigation instruction of the route has slid in a half way into the screen from the right side of the screen. The navigation has zoomed out and rotated the map view clockwise. However, because the banner 230 displaying the current navigation instruction has not been completely slid out of the screen, the navigation application displays a partial peek view. That is, the direction of an invisible vector from the current position of the user to the location for the next navigation instruction is not yet pointing to the top side of the screen. The zooming level has not reached the level at which both the current position of the user and the location for the next navigation instruction are displayed together in the screen.

The third stage 215 shows that the user is no longer touching (or no longer sensed as a touch by the device) the screen. The user may have lifted up the finger or have slid the finger off the screen after completely dragging the banner 230 out of the screen. The banner 235 displaying the next navigation instruction is fully displayed in the screen. The navigation application thus displays the full peek view for the next navigation instruction. That is, the navigation application has zoomed out, panned and/or rotated the map view such that the current position of the user and the location for the next navigation instruction are displayed in the screen together. The vector (not shown) from the puck 135 to the location for the next navigation instruction (i.e., the junction of the A street and the Fair Street in this example) also points substantially to the top side of the screen.

In some embodiments, the navigation application maintains the peek view or the partial peek view only if the touch (or the near-touch) that drags the current navigation instruction is maintained. When the touch is not maintained, e.g., due to the user's lifting up the finger that has been touching the screen or due to sliding the finger out of the screen, the navigation application restores the navigation view for the current navigation instruction. That is, the navigation application slides the banner for the current navigation instruction fully back to the screen. And the navigation application rotates back, zooms in, and/or pans the map view back such that the current direction of the travel points to the top side of the screen. In some embodiments, touching the screen and moving the figure while maintaining the touch with the screen is referred to as a touch drag or a touch drag operation. The touch drag operation ends when the finger is lifted from the screen or falls out of the screen.

The fourth stage 220 shows the partial peek view for the current navigation instruction because the navigation application of some embodiments does not discretely restore the navigation view for the current navigation instruction. Rather, the navigation application smoothly transitions from the peek view for the next navigation instruction to the navigation view. That is, the navigation application of some embodiments animates the map view to show the intermediate partial peek views until the navigation view is fully restored just like the navigation application does to transition from the navigation view to the peek view. The fifth stage 225 shows that the navigation instruction has fully restored the navigation view for the current navigation instruction. Thus, the fifth stage 225 in this example looks identical to the first stage 205.

C. Peeking Behind

Figure 3:
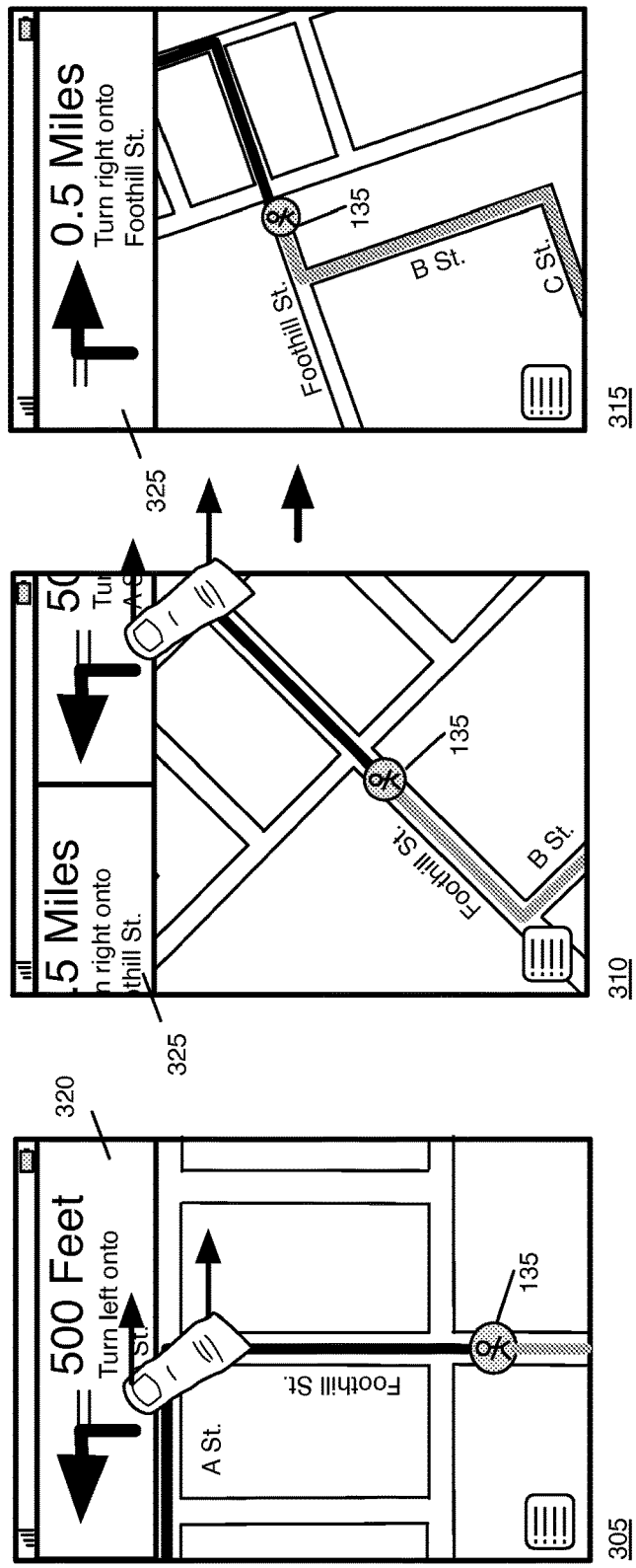
FIG. 3 illustrates that the navigation application of some embodiments allows a user to peek behind the previous navigation instructions for a route being traveled by the user.

FIG. 3 illustrates that the navigation application of some embodiments allows a user to peek behind the previous navigation instructions for a route being traveled by the user. This figure illustrates in three stages 305-315 that the navigation application displays a location that corresponds to the previous navigation instruction in response to the user's swiping a banner 320 that displays the current navigation instruction.

In some embodiments, the navigation application allows the user to slide out the banner in one direction (e.g., to the left) so that another banner that displays the next navigation instruction can slide in. The navigation application allows the user to slide out the banner in another direction (e.g., to the right) so that another banner than displays the previous navigation instruction can slide in.

As the banner displaying the current navigation instruction slides out and another banner displaying the previous navigation instruction slides in, the navigation application of some embodiments changes the zoom level, pans the map view, and/or rotates the map view. The navigation application of some embodiments performs the zooming, panning and rotating in such a way that the navigation application displays both the current position of the device and the location that corresponds to the previous navigation instruction in the screen of the device together. In some such embodiments, the navigation application displays the entire previous section of the route, which ends at the location for the previous navigation instruction and begins at the location for the navigation instruction that is prior to the previous navigation instruction in the sequence of navigation instructions for the route.

At the first stage 305, the navigation application displays the navigation view for the current navigation instruction. The navigation application displays the banner 320 that displays the current navigation instruction. The navigation application also displays the puck 135 that indicates the current position of the user who carries the device. At this stage 305, the user starts swiping the banner 320 to the right side of the screen using a finger.

The second stage 310 shows that the user's finger has dragged the banner 320 to the right and another banner 325 that displays the previous navigation instruction has slid in from the left side of the screen. As the banner 320 that displays the current navigation instruction has not completely slid out of the screen at this stage 310, the navigation application displays a partial peek view.

For displaying a full peek view for a previous navigation instruction, the navigation application rotates the map view to make a vector from the location for the previous navigation to the current position of the user point to the top side of the screen. In the example of this figure, this vector (not shown) is from the junction of the B Street and the Foothill Street to the puck 135. However, in other embodiments, the navigation application makes a vector, from the beginning of the previous section of the travel, rather than from the end of the previous section of the travel, to the current position of the user, point to the top side of the screen. In the example of this figure, this vector is from the junction of the B Street and the C Street to the puck 135 as shown at the third stage 315 because the previous section of the route begins at this junction.

To show the full peek view, the navigation application of some embodiments also pans the map view to move the puck 135 to a position above the center of the screen as shown at the fourth stage 315. In this manner, the navigation application visually distinguishes a peek view for a past navigation instruction from a peek view for a future navigation instruction.

At the second stage 310, the navigation application has not fully rotated the map to reach the full peek view displayed at the third stage 315. Also, the navigation application has not panned the map view enough to move the puck 135 above the center of the screen. The navigation application has not zoomed out to fully display the previous section of the route.

The third stage 315 shows that the user has completely dragged the banner 320 out of the screen and the banner 325 for the previous navigation instruction is fully displayed in the screen. The navigation application now displays the full peek view for the previous navigation instruction.

As shown, the navigation application has fully zoomed out to a zoom level at which the map view display both the current position of the user and the entire previous section of the route. The section of the route for the previous navigation instruction in this example is the portion of the B Street between the junction of the Foothill Street and the junction of the B Street and the C Street. The navigation application has also rotated the map view such that the direction from the beginning of the previous section of the route to the current position of the user points to the top side of the screen. The puck 135 has moved up to a position above the center of the screen.

In the example illustrated in FIG. 3, the user has peeked behind to view the location for the previous navigation instruction and the previous section of the route only. However, the navigation application of some embodiments allows the user to peek behind to view as many past navigation instructions and sections of the route as possible all the way back to the first navigation instruction of the route. In such cases, the navigation application performs zooming, rotating and panning to display the current location and all the locations for all the previous navigation instructions in the screen together.

In some embodiments, the navigation application uses one direction of rotation (e.g., clockwise) for reaching a peek view for a future navigation instruction and another direction of rotation for reaching a peek view for a past navigation instruction. Alternatively or conjunctively, the navigation application uses either direction of rotation that gives the least amount of rotation to reach a peek view. That is, for example, rather than rotating the map by 270 degrees clockwise, the navigation application of these embodiments rotates the map 90 degrees counterclockwise to reach a peek view.

D. Responding to Touch Movement

Figure 4:
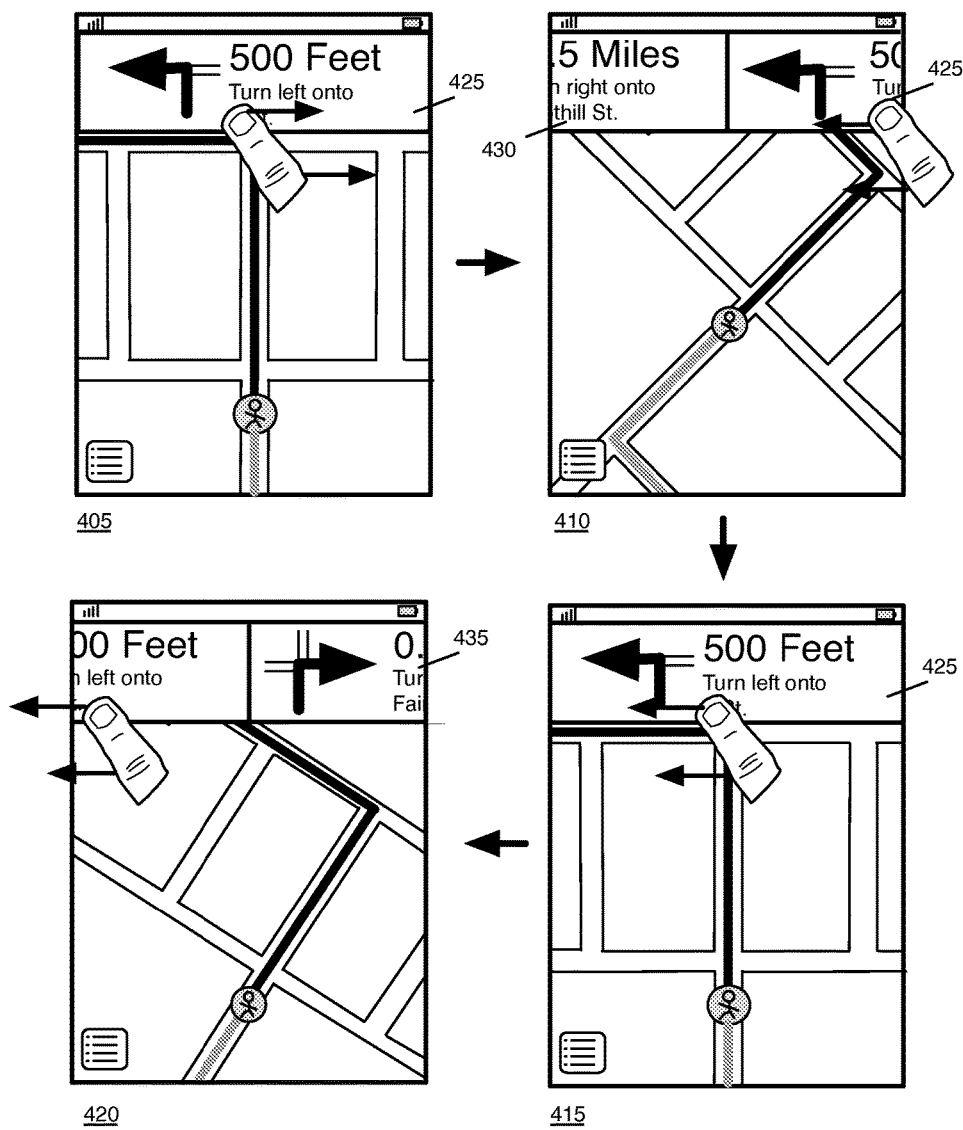
FIG. 4 illustrates an example of the navigation application of some embodiments that follows the movement of the touch on the screen in order to change the map view smoothly as the touch on the screen moves.

FIG. 4 illustrates an example of the navigation application of some embodiments that follows the movement of the touch on the screen in order to change the map view smoothly as the touch on the screen moves. This figure shows in four stages 405-420 that the navigation application displays partial peek views as the touch on the screen moves away from the initial position of the touch.

At the first stage 405, the user touches a banner 425 that displays the current navigation instruction of a route being traveled by the user. The user starts dragging the banner 425 to the right side of the screen by moving the finger to the right side while maintaining the touch with the screen.

In some embodiments, the navigation application moves a banner horizontally by chasing the horizontal movement of the touch. The movement of the touch does not have to be perfectly parallel to a horizontal line of the screen in some embodiments. When the touch's path on the screen is not parallel to the top or bottom side of the screen, the navigation application takes a horizontal component of an invisible vector drawn from the touch's initial position to the current position on the screen and moves the banner by a length that is proportional to the length of the horizontal component. Moreover, the navigation application of some embodiments moves the banner to chase the movement of the touch even if the touch falls out of the banner (but the touch is still on the screen).

At the second stage 410, the user has dragged the banner 425 to the right and the right half of the banner 425 has slid out of the screen. The navigation application has slid in a banner 430 for the previous navigation instruction because the user has dragged the banner 435 to the right side of the screen. The navigation application displays a partial peek view for the previous navigation instruction as shown. At the stage 410, the user maintains the touch by, e.g., not lifting up the finger from the screen. The user also starts dragging the banner 425 to the left by moving the finger to the left while maintaining the touch with the screen.

At the third stage 415, the user has moved the finger near the initial position on the screen at which the finger was at the first stage 405. The navigation application displays the navigation view for the current navigation instruction. The user also drags the banner 425 to the left side of the screen by keeping moving the finger to the left while maintaining the touch with the screen.

At the fourth stage 420, the user has dragged the banner 425 and the left half of the banner 425 has slid out of the screen. The navigation application has slid in a banner 435 for the next navigation instruction because the user has dragged the banner 435 to the left side of the screen. The navigation application displays a partial peek view for the next navigation instruction as shown. At the stage 420, the user maintains the touch with the screen.

Figure 5:
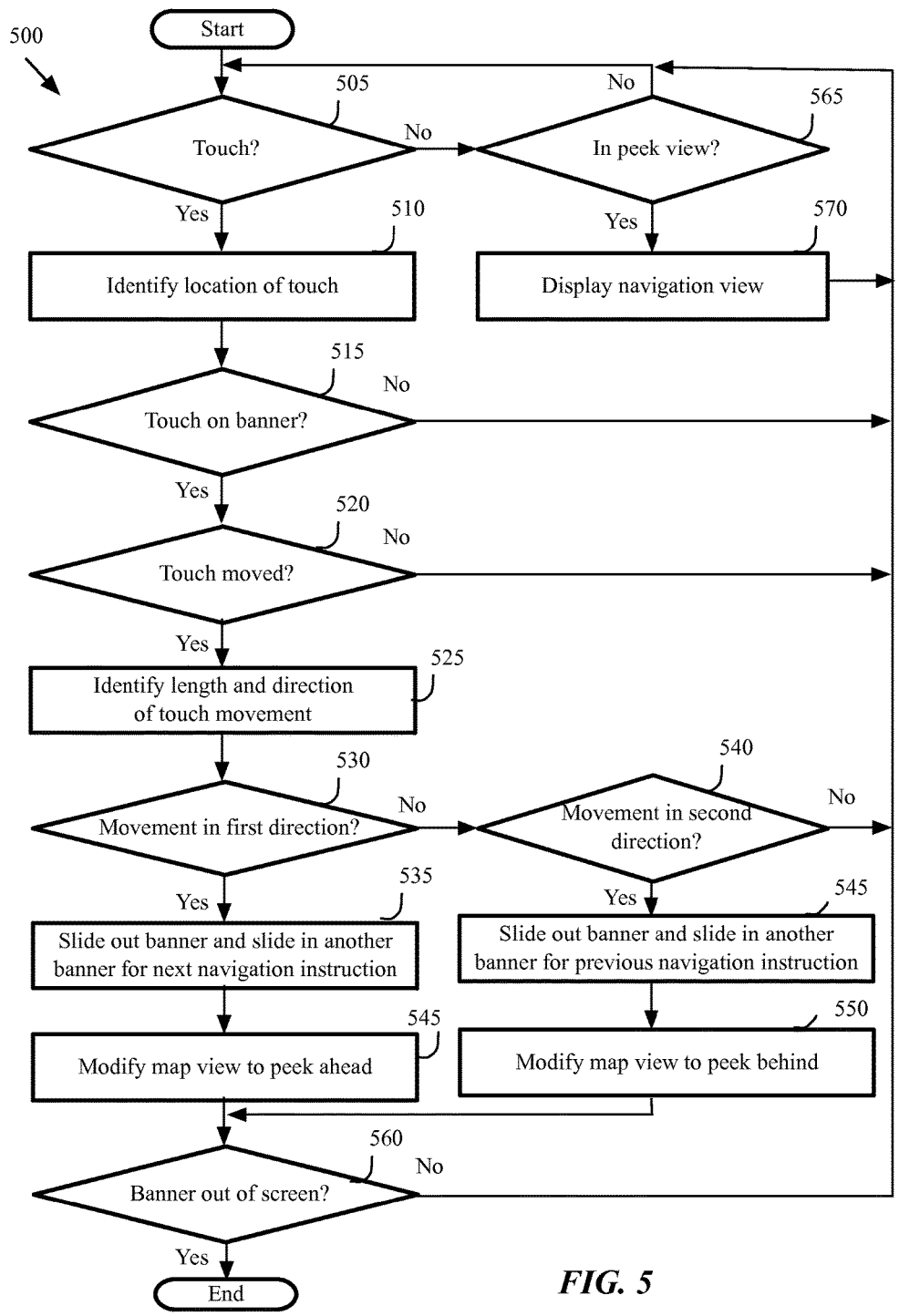
FIG. 5 conceptually illustrates a process that the navigation application of some embodiment performs to present the navigation view for the current navigation instruction of a route and a peek view for the previous or next navigation instruction of the route.

FIG. 5 conceptually illustrates a process 500 that the navigation application of some embodiment performs to present the navigation view for the current navigation instruction of a route and a peek view for the previous or next navigation instruction of the route. The navigation application of some embodiments performs the process 500 on a device that has a touch-sensitive screen and/or a near-touch sensitive screen that displays the output of the navigation application. The process 500 starts when the navigation application is presenting a map view for the route being traveled by a user for the current position of the user.

The process 500 begins by determining (at 505) whether the user is touching the screen of the device. In some embodiments, the process 500 determines whether the user is touching the screen based on the information (e.g., information whether the screen is being touched, coordinates of the touch if the user is touching the screen at one or more locations of the screen, etc.) from a touch interface of the device. When the process 500 determines (at 505) that the user is not touching the screen, the process 500 proceeds to 565, which is described further below.

When the process 500 determines (at 505) that the user is touching the screen, the process 500 identifies (at 510) the location of the touch on the screen. In some embodiments, the process 500 identifies the location of the touch on the screen from the information received from the touch interface of the device.

Next, the process 500 of some embodiments optionally determines (at 515) whether the touch is on a banner that is currently displayed in the screen. The banner displays a navigation instruction for the route that guides the user at a location on the route in order for the user to reach the destination of the route. The banner is occupying a portion of the screen and is overlaid on the map view in some embodiments. The process 500 of some embodiments determines that the touch is on the banner when the coordinates of the screen fall within a set of coordinates of the screen that the banner is currently occupying. In some embodiments, the screen has a coordinate system. The coordinates of the touch and the banner are of this coordinate system.

When the process 500 determines (at 515) that the touch is not on the banner, the process 500 loops back to 505 to check whether the touch is maintained with the screen. When the process 500 determines (at 515) that the touch is on the banner, the process 500 determines (at 520) whether the touch has moved on the screen. In some embodiments, the process 500 keeps track of the locations of the touch while the touch is maintained with the screen. The process 500 determines that the touch is moving on the screen when the location of the touch is changing while the touch is maintained.

When the process 500 determines (at 520) that the touch has not moved on the screen, the process 500 loops back to 505 to check whether the touch is maintained with the screen. When the process 500 determines (at 520) that the touch has moved on the screen, the process 500 identifies (at 525) the length and the direction of the movement that the touch has made. In some embodiments, the process 500 identifies a vector on the coordinate system of the screen that represents the movement of the touch and identifies only the horizontal component (e.g., an x-component) of the vector as the length of the movement. In some such embodiments, the process 500 identifies the length of the horizontal component of the vector as zero when the vector is not substantially parallel to a horizontal line on the screen's coordinate system (e.g., not within 40 degrees with respect to a horizontal line of the screen). That is, the process 500 ignores the movement of touch if the movement is not considered a horizontal swipe on the screen.

The process 500 then determines (at 530) whether the movement of the touch is in a first direction (e.g., to the left side of the screen). As mentioned above, the process 500 of some embodiments considers only the horizontal component of the vector that represents the movement. The process 500 of these embodiments determines whether the movement of the touch is in the first direction based on the direction of the horizontal component of the vector.

When the process 500 determines (at 530) that the movement of the touch is not in the first direction, the process 500 proceeds to 540, which is described further below. When the process 500 determines (at 530) that the movement of the touch is in the first direction, the process at 535 slides out the banner and slides in another banner that displays the next navigation instruction of the route. The process 500 slides out the banner by a length that is proportional to the length of the movement of the touch. As the process 500 slide out the banner, the process 500 also modifies (at 545) the map view to display a peek view for peeking ahead the next navigation instruction.

The process in some embodiments modifies the map view by rotating, zooming and/or panning the map view such that (1) a vector, from the current location of the user to the location of the next navigation instruction (i.e., the end of the section of the route for the next navigation instruction), points to the top side of the screen and (2) both the current position of the user and the location for the next navigation instruction are displayed in the screen together. The process then proceeds to 560, which is described further below.

When the process 500 determines (at 530) that the movement of the touch is not in the first direction, the process 500 determines (at 540) whether the movement of the touch is in the second direction. In some embodiments, the first and second directions are the opposite directions to each other. When the process 500 determines (at 540) that the movement of the touch is not in the second direction, the movement of the touch is neither in the first direction nor in the second direction. That is, the movement is deemed to have a zero length or is not considered as a horizontal movement. In such cases, the process 500 loops back to 505 to check whether the touch is maintained with the screen.

When the process 500 determines (at 540) that the movement of the touch is in the second direction, the process at 550 slides out the banner and slides in another banner that displays the previous navigation instruction of the route. The process 500 slides out the banner by a length that is proportional to the length of the movement of the touch. As the process 500 slide out the banner, the process 500 also modifies (at 555) the map view to display a peek view for peeking behind.

The process in some embodiments modifies the map view by rotating, zooming and/or panning the map view such that (1) a vector, from the beginning of the section of the route for the previous navigation instruction to the current location of the user, points to the top side of the screen and (2) both the current position of the user and the beginning of the section for the previous navigation instruction are displayed in the screen together. The process in other embodiments modifies the map view by rotating, zooming and/or panning the map view such that (1) a vector, from the location for the previous navigation instruction to the current location of the user, points to the top side of the screen and (2) both the current position of the user and the location for the previous navigation instruction are displayed in the screen together.

The process then determines (at 560) whether the banner displaying the current navigation instruction has been slid out of the screen. When the process determines (at 560) that the banner has not been slid out of the screen, the process loops back to 505 to check whether the touch is maintained with the screen. Otherwise the process ends.

When the process 500 determines (at 505) that the user is not touching the screen, the process 500 of some embodiments determines (at 565) whether a peek view is being displayed in the screen. That is, the process 500 determines whether the process has rotated, zoomed out, and/or panned the map view for the next or previous navigation instruction. When the process determines (at 565) that the peek view is being displayed, the process bounces (at 570) back to the navigation view from the current navigation instruction. This is because the touch is no longer maintained and the process of some embodiments bounces back to the navigation view from the peek view when the touch is not maintained. When the process 500 determines (at 565) that the peek view is not being displayed, the process 500 loops back to 505 to check whether the user touches the screen.

E. Automatically Reverting to Navigation View

Figure 6:
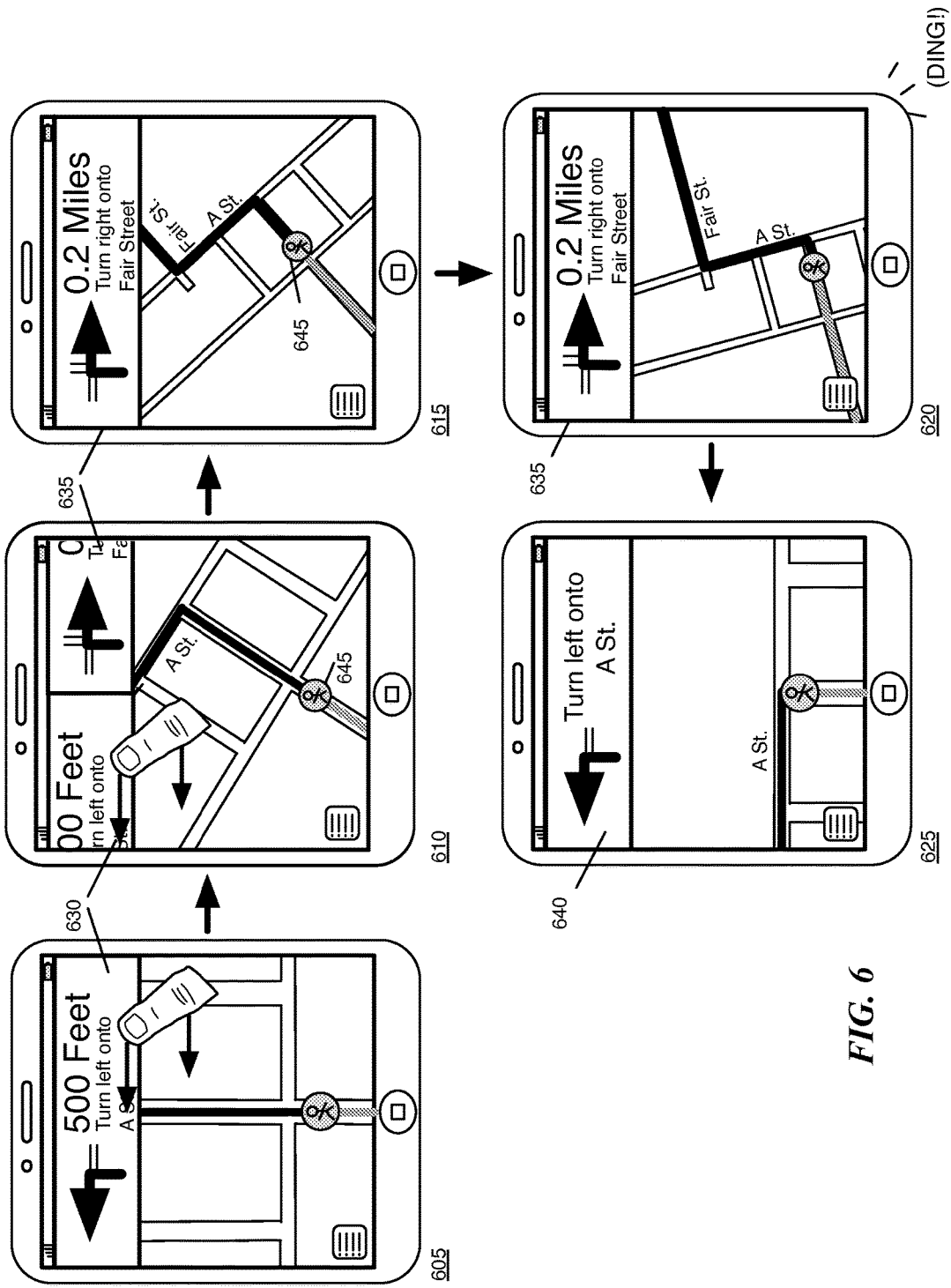
FIG. 6 illustrates that the navigation application backs out from a peek view for the next navigation instruction of a route to a navigation view for the current navigation instruction of the route.

FIG. 6 illustrates in five stages 605-625 that the navigation application backs out from a peek view for the next navigation instruction of a route to a navigation view for the current navigation instruction of the route when the user moves close to or arrives at a location for the current navigation instruction.

The first and second stages 605 and 610 are similar to the first and second stages 205 and 210 described above by reference to FIG. 2. That is, at the first and second stages 605 and 610, the user has dragged a banner 630 that displays the current navigation instruction for the current location of the user to the left side of the screen. At the second stage 610, the navigation application displays a partial peek view for the next navigation instruction.

At the third stage 615, like at the third stage 215 of FIG. 2, the navigation instruction displays the full peek view for the next navigation instruction. However, in contrast to the navigation application of some embodiments at the third stage 215 of FIG. 2, the navigation application of some embodiments at the third stage 615 does not start restoring the navigation view for the current navigation instruction even if the touch is not maintained. The navigation application of these embodiments keeps the peek view for the next instruction even if the touch is not maintained with the screen. Moreover, the navigation application of some of these embodiments updates the position of the current position indicator (e.g., a puck 645) in the peek view. As shown at the third stage 615 by the position of the puck 645 on the map, the user has moved to a position that is within a block from the location for the left turn to the A Street. The user had been more than a block away from the location for the left turn to the A Street as shown by the previous stage 610.

The fourth stage 620 shows that the navigation application still displays the peek view for the next navigation instruction. The user has moved closer to the location for the left turn as indicated by the position of the puck 645 in the map. In some embodiments, the navigation instruction notifies the user of an imminent turn when the position of the user falls within a threshold distance (e.g., five feet) from the location for the turn. For instance, the navigation application of some embodiments at the fourth stage 620 presents a short audible notification (e.g., a short audible sound such as "ding") to the user to notify the user of the imminent turn.

When the user reaches the location for the turn, the navigation application of some embodiments automatically reverts back to the navigation view for the turn. As shown at the fifth stage 625, the navigation application restores the navigation view for the current navigation instruction as the user arrives at the location for the left turn to the A Street. The navigation application of some embodiments also updates the content displayed on the banner 630 for the current navigation instruction. For instance, as shown, the navigation application does not display the remaining distance to the location of the turn because the user has reached the location for the turn.

Figure 7:
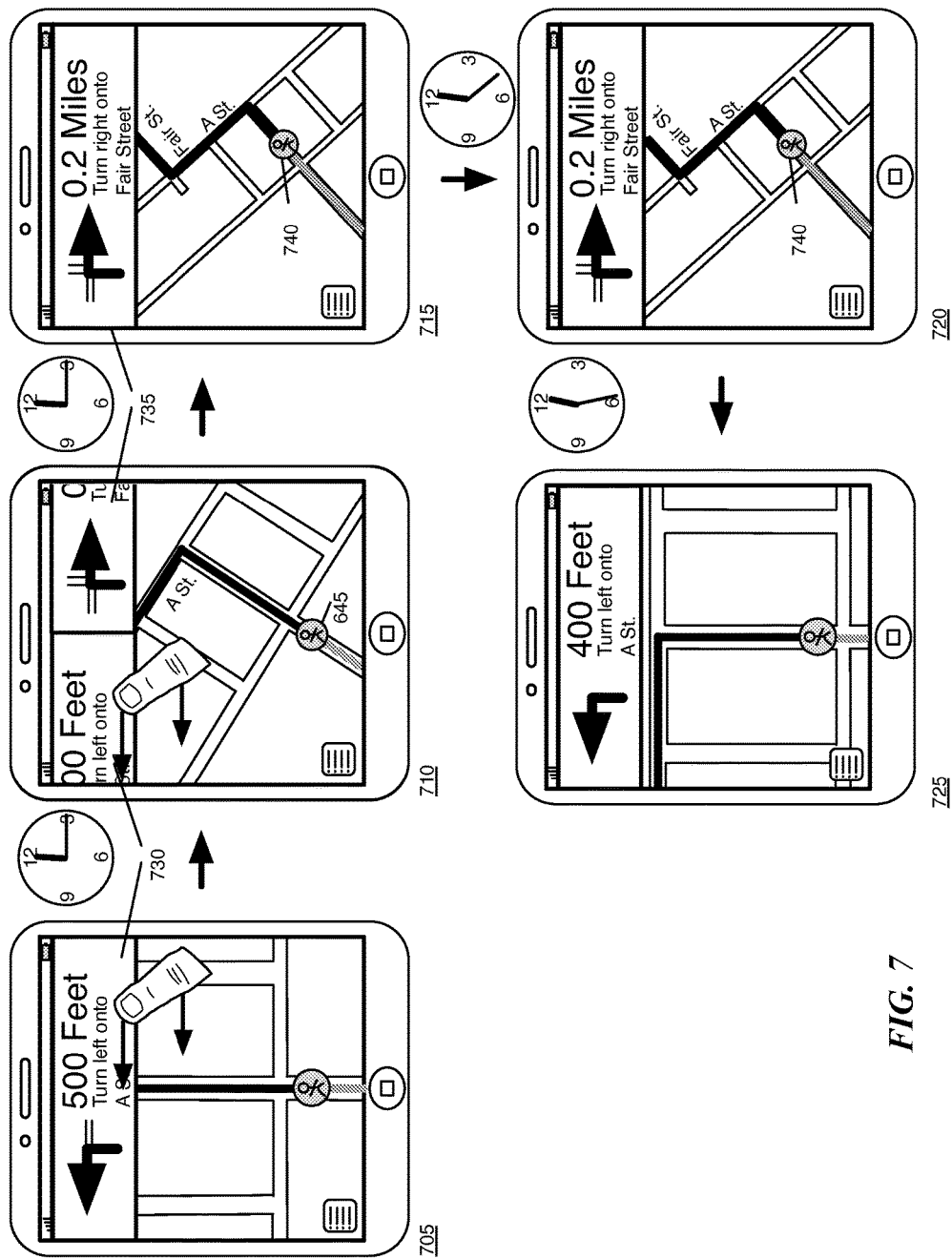
FIG. 7 illustrates a situation in which the navigation application of some embodiments automatically reverts to the navigation view for the current navigation instruction from the peek view for the next navigation instruction FIG. 8 conceptually illustrates a process that the navigation application of some embodiment performs to revert automatically to the navigation view for the current navigation instruction of a route being traveled by a user.

FIG. 7 illustrates another situation in which the navigation application of some embodiments automatically reverts to the navigation view for the current navigation instruction from the peek view for the next navigation instruction. Specifically, this figure illustrates in terms of five stages 705-725 that the navigation application backs out from displaying the peek view and automatically reverts to the navigation view when a defined period of time elapses. This figures also conceptually illustrates a clock after each of the first four stages 705-720 to indicate the time at which the stage ends.

At the first stage 705, the navigation application displays a banner 730 that displays the current navigation instruction of a route being traveled by a user. The user starts dragging the banner 730 to the left side of the screen. The navigation application advances to the next stage 710 at 12:15 PM as indicated by the clock depicted between the stages 705 and 710.

At the second stage 710, the navigation application displays a partial peek view for the next navigation instruction as the user drags the banner 730 about a half way out of the screen to the left. The navigation application advances to the next stage 715 at 12:15 PM as indicated by the clock depicted between the stages 710 and 715.

At the third stage 715, the navigation instruction displays the full peek view for the next navigation instruction. A banner 735 displaying the next navigation instruction is fully displayed. The user has moved to a position that is within a block from the location for the left turn to the A Street as indicated by a current position indicator 740. The user had been more than a block away from the location for the left turn to the A Street as shown by the previous stage 710. The navigation application advances to the next stage 720 at around 12:25 PM as indicated by the clock depicted between the stages 715 and 720.

The fourth stage 720 shows that the navigation application still displays the peek view for the next navigation instruction. The user has not moved from the position at which the user was at the previous stage 715. The user stops moving and maintains the position as indicated by the current position indicator 740. The navigation application advances to the next stage 725 at around 12:29 PM as indicated by the clock depicted between the stages 720 and 725.

As mentioned above, the navigation application of some embodiments reverts to the navigation view for the current navigation instruction from the peek view for the future or past navigation instructions when a defined period of time elapses while the navigation application is displaying the peek view. This period of time is predefined for the navigation application or the navigation application allows the user to determine the period of time. In some embodiments, the period of time is set to a certain period of time (e.g., three minutes) when the navigation application is in the pedestrian mode. The fifth stage 725 shows that the navigation application of some embodiments has reverted to the navigation view for the current navigation instruction because more than the defined period of time is lapsed (e.g., from 12:25 PM to 12:29 PM) while the navigation application displays the peek view.

Figure 8:
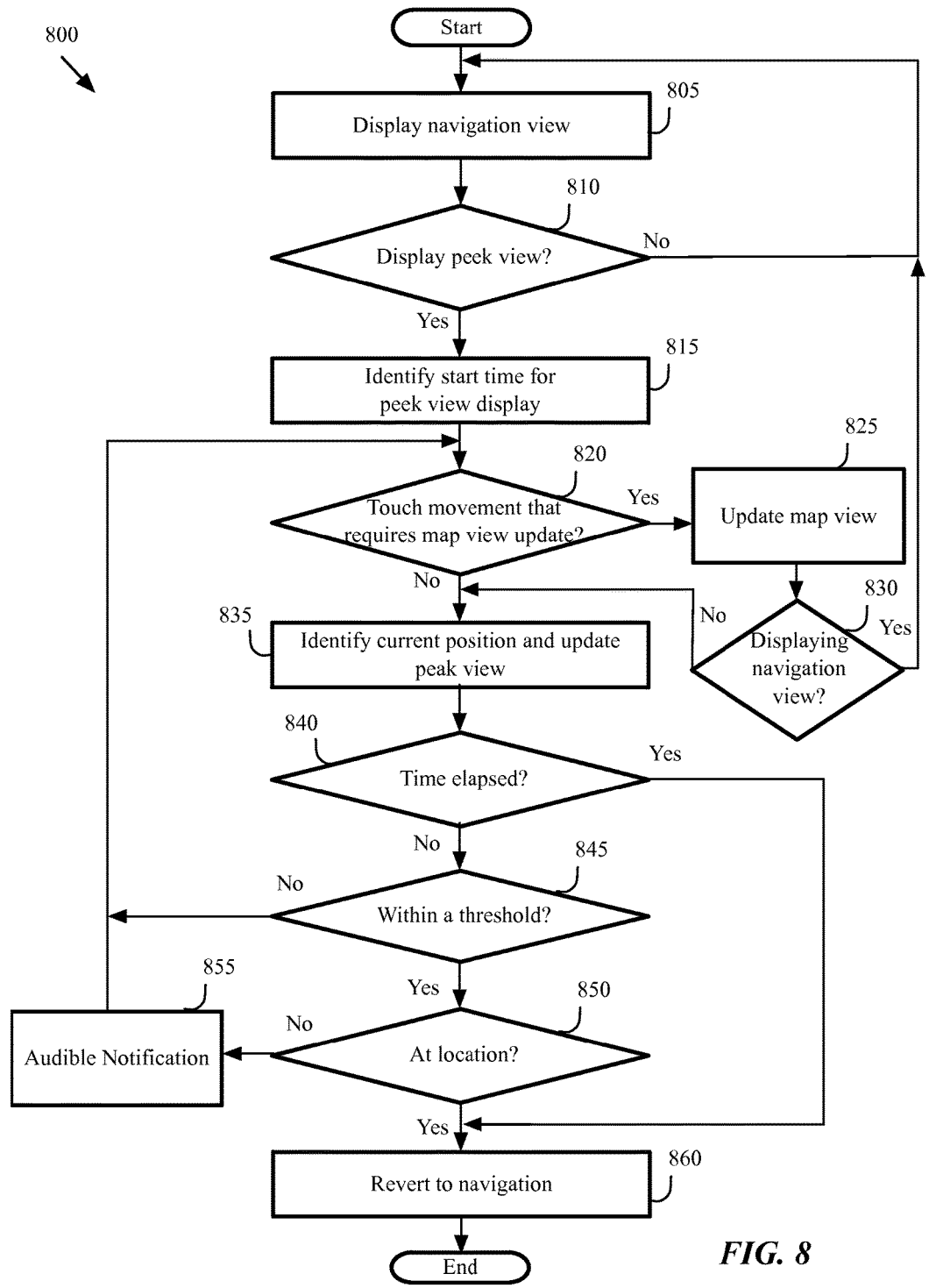

FIG. 8 conceptually illustrates a process 800 that the navigation application of some embodiment performs to revert automatically to the navigation view for the current navigation instruction of a route being traveled by a user. The navigation application of some embodiments performs the process 800 on a device that has a touch-sensitive screen and/or a near-touch sensitive screen that displays the output of the navigation application. The process 800 starts when the navigation application is displaying a map view for the route.

The process 800 begins by displaying (at 805) a navigation view for the current navigation instruction. That is, the process 800 displays (at 805) the map view such that the current direction of the travel by the user is pointing to the top side of the screen and the map view is updated as the user makes progress on the route.

Next, the process 800 determines (at 810) whether the process 800 should display a peek view for peeking ahead or behind. In some embodiments, the process 800 determines that the peek view is to be displayed when the process 800 receives, while displaying the navigation view, a touch movement that causes the navigation application to slide out a banner displaying the current navigation instruction.

When the process 800 determines (at 810) that the process 800 is not to display the peek view, the process 800 loops back to 805 to display the navigation view. When the process determines (at 810) that the process 800 should display the peek view, the process 800 (at 815) displays the peek view and identifies the start time of the peek view display. In some embodiments, the process 800 obtains the time information for an instance in time at which the process 800 starts modifying the map view to display the peek view. The process 800 records the time as the start time of the peek view display.

Next, the process 800 determines (at 820) whether the process has received a touch movement that requires an update of the map view. The process 800 determines that the received touch movement requires an update of the peek view when the movement causes the navigation application to move a banner being displayed in the screen.

When the process 800 determines (at 820) that the process has not received a touch movement or the received touch movement does not require an update of the map view, the process 800 proceeds to 835, which is described further below. When the process 800 determines that the received touch movement requires an update of the map view, the process 800 updates the map view (at 825) based on the touch movement. For instance, the process 800 further rotates, pans and or zooms in or out the map view.

The process 800 then determines (at 830) whether the map view has turned into the navigation view for the current navigation instruction as a result of updating the map view. That is, in some cases, the user may drag in the banner that displays the current navigation instruction back into the screen as they peek ahead and/or behind. In such cases, it is the navigation view rather than the peek views that the navigation ends up displaying.

When the process determines (at 830) that the map view has turned into the navigation view, the process 800 loops back to 805 to display the map view. When the process determines (at 830) that the map view has not turned into the navigation view, the process 800 proceeds to 835 to identify the current position of the user and to move the current position indicator in the map view if necessary.

Next, the process 800 determines (at 840) whether a defined period of time has elapsed since the identified (at 815) start time for the peek view display. The period of time is for determining whether the navigation application has been displaying the peek view for too long. In some embodiments, this period of time is preconfigured for the navigation application. Alternatively or conjunctively, the user can set this period of time for the navigation application in some embodiments.

When the process 800 determines (at 840) that the period of time has elapsed since the start of the peek view display, the process 800 reverts (at 860) back to the navigation view. When the process 800 determines (at 840) that the period of time has not elapsed since the start of the peek view display, the process 800 determines (at 845) whether the current position of the user is within a threshold distance (e.g., five feet, 200 feet, 1 mile, depending on the speed of the user and whether the navigation application is in the driving mode or in the pedestrian mode) from the location for the current navigation instruction. This threshold distance is for determining whether the user has come close to the location for the current navigation instruction.

When the process 800 determines (at 845) that the current position of the user is not within the threshold distance from the location for the next navigation instruction, the process 800 loops back to 820 to check whether the process has received a touch movement that requires an update of the map view. When the process 800 determines (at 845) that the current position of the user is within the threshold distance, the process 800 determines (at 850) whether the current position of the user is at the location for the current navigation instruction.

When the process 800 determines (at 850) that the current position of the user is not at the location for the current navigation instruction, the process 800 presents (at 855) an audible notification to the user (if the process has not given the audible notification to the user already). This is because, at this point, the current position of the user is within the threshold distance from the location for the current navigation instruction but is not at the location. The process 800 then loops back to 820 to check whether the process has received a touch movement that requires an update of the map view.

When the process 800 determines (at 850) that the current position of the user is at the location for the current navigation instruction, the process 800 reverts (at 860) to the navigation view from the peek view. The process 800 then ends.

Having described peeking ahead and behind for the navigation application that is in the pedestrian mode, the next Section II now describes peeking ahead and behind for the navigation application that is in the driving mode.

II. Peeking Ahead and Behind in the Driving Mode

A. Peeking Ahead

Figure 9:
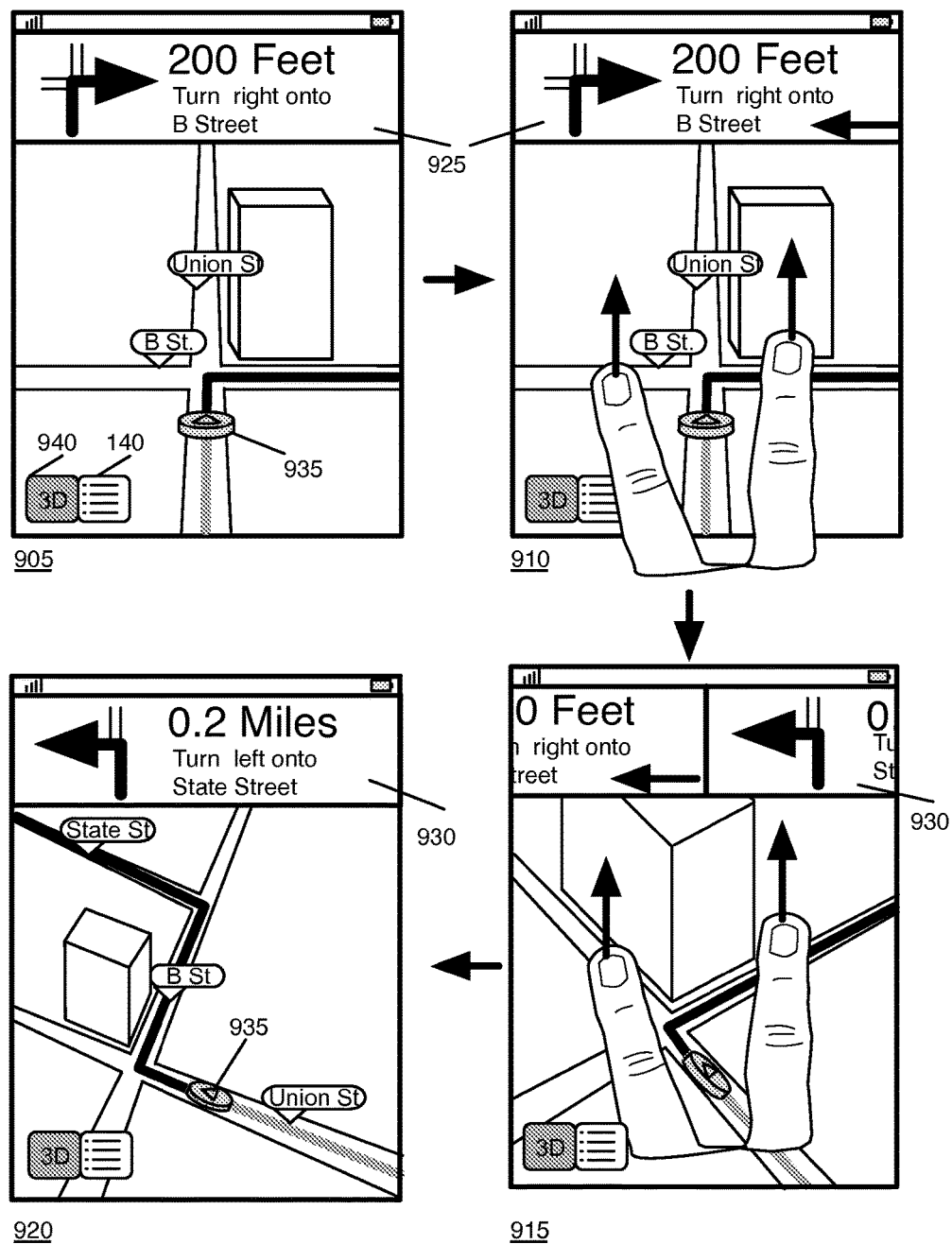
FIG. 9 illustrates an example of the navigation application that allows a user to peek ahead the next navigation instructions for a route that is being presented in the driving mode.

In some embodiments, the navigation application allows a user to peek ahead or behind the navigation instructions while the navigation application is in the driving mode in order to present the navigation instructions and the map views suitable for the user who is driving. FIG. 9 illustrates an example of the navigation application that allows a user to peek ahead the next navigation instructions for a route that is being presented in the driving mode. Specifically, this figure illustrates in terms of four stages 905-920 that the navigation application displays a location that corresponds to the next navigation instruction in response to the user's swiping up the screen of a device on which the navigation application executes.

At the first stage 905, the navigation application of some embodiments is in the driving mode, displaying the map view for the current navigation instruction in 3D. In some embodiments, the 3D map view shows an area of a map from a viewpoint of a virtual camera that chases the car by flying behind the car. Details of the movement of the virtual camera movement to generate 3D map views are further described in the above-incorporated U.S. patent application Ser. No. 13/632,040.

As shown at the stage 905, the constructs (e.g., buildings and roads, etc.) in the map are rendered in 3D and a puck 935 that indicates the current position of the user is also rendered in 3D. The navigation application is also displaying a navigation view for the current navigation instruction. The current direction of travel points to the top side of the screen and the puck 935 is placed at a position below the center of the screen.

The navigation application displays a banner 925 that displays the current navigation instruction for a route. The navigation application of some embodiments also displays several floating controls, including a 3D control 940 and the list control 140 (described above by reference to FIG. 1). The 3D control 940 is a control for viewing a map in 3D in some embodiments. The navigation application provides the 3D control 750 as a quick mechanism of getting into and out of a 3D view. At the first stage 905, the 3D control 750 is rendered in grey to indicate that the map view is displayed in 3D.

Like in a navigation view in 2D presented by the navigation application in the pedestrian mode, when the user is peeking ahead to see the location for the next navigation instruction, the navigation application rotates the map view such that the direction of a vector from the current position of the user to the location for the next navigation instruction (i.e., the end of the next section of the route) points to the top side of the screen.

The second stage 910 shows that the user starts swiping up the screen. In some embodiments, the navigation application in the driving mode allows the user to move a banner by swiping the screen vertically using one or more fingers. In some embodiments, the navigation slides the banner to the left when the user swipes up the screen. The navigation application of these embodiments slides the banner to the right when the user swipes down the screen.

In some embodiments, the navigation application recognizes as swipe ups and downs the swipes that are not perfectly vertical with respect to the sides of the screen. For instance, the navigation application recognizes a swipe as a swipe up or a swipe down, when the swipe the user performs is within a certain degrees (e.g., 40 degrees) from a vertical line of the screen.

The third stage 915 shows that the navigation has slid out the banner 925 to the left and slid in another banner 930 from the right side of the screen as the user swipes up the screen. The banner 930 displays the next navigation instruction. At this stage 915, both of the banner 925 and the banner 930 are displayed in the screen partially. This is because, in some embodiments, the distance by which a banner moves is proportional to the vertical length of the swipe that the user performs. For instance, when it takes a swipe with a length of a banner to move an entire banner out of the screen, the navigation moves a half of the banner when the swipe is a half as long as the banner.

Like the navigation view in 2D, the amount of the rotation of the map view in 3D that the navigation application performs is also proportional to the size of the portion of the banner that has slid out. For instance, when it takes a 90-degree clockwise rotation of the map view to make the vector from the current position of the user to the location for the next navigation instruction point to the top side of the screen, the navigation application rotates the map view by 30 degrees clockwise when a third of the banner slides out of the screen to the left. As the banner 925 is not completely slid out of the screen at this stage 910, the navigation application has not fully rotated the map view to have that vector to point to the top side of the screen.

Like the navigation view in 2D, the amount of zooming the map view in 3D that the navigation application of some embodiments performs is also proportional to the size of the portion of the banner that has slid out of the screen. For instance, when it takes to zoom out the map view by 50 percent to display both the current location and the location for the next navigation instruction, the navigation application zooms out the map view by 25 percent when a half of the banner slides out of the screen. At the third stage 915, because the banner 925 is not completely slid out of the screen, the navigation application has not fully zoomed out the map view display both the current position of the user and the location for the next navigation instruction.

Like the navigation application does when rendering the map views in 2D, the navigation application may also pan the 3D map view as the 3D map view is rotated or zoomed out, in order to display on the screen a new region of the map that includes both the current position of the device and the location for the next navigation instruction. In some embodiments, the navigation application keeps the current position indicator stationary with respect to the sides of the screen while the map view is being zoomed out, rotated and/or panned.

In some embodiments, the navigation application performs the rotating, zooming and/or panning by moving the virtual camera to a position at which (1) the camera can view both the current position of the user and the location for the next navigation instruction and (2) the camera points to the direction of the vector from the current position of the user to the location for the next navigation instruction. In some cases, the road on which the user is currently on and the puck that indicates the current position of the user may be blocked by the constructs (e.g., buildings) from the viewpoint of the virtual camera. In such cases, the navigation application of some embodiments may render the constructs blocking the road and the puck translucently such that the road and the puck are visible from the viewpoint of the virtual camera. Alternatively or conjunctively, the navigation application renders the constructs blocking the road and the puck flat to the ground so that they do not block the road or the puck from the viewpoint of the virtual camera.

The navigation application moves the viewpoint of the camera further away from a particular location on the ground of the virtual 3D space in order to zoom out the map view. To zoom in the map view, the navigation application moves the viewpoint closer to the particular location. The navigation application moves the viewpoint of the virtual camera while keeping the altitude from the ground of the virtual 3D space to pan the map view. The navigation application moves the viewpoint of the camera to follow a perimeter of a circle that has the particular location as the center of the circle, in order to rotate the map view. More details of the movement of the virtual camera to zoom, pan and rotate the map views are further described in the above-incorporated U.S. patent application Ser. No. 13/632,040.

As shown at the third stage 915, the navigation application of some embodiments changes the appearance of the puck 935 in 3D so that the pointer displayed on top of the puck points to the current direction of the travel. At the third stage 915, the user continues performing the swipe up.

The fourth stage 920 shows a 3D peek view for the next navigation instruction after the user has swiped up for an enough length of the screen. The navigation application has completely slid the banner 925 out of the screen. The navigation application has also slid in the banner 930 that displays the next navigation instruction such that the banner 930 is fully displayed in the screen. As shown, the navigation application has fully zoomed out to a zoom level at which the map view display both the current position of the user and the location for the next navigation instruction. The location for the next navigation instruction in this example is the junction of the B Street and the State Street at which the user is to turn left according to the next navigation instruction displayed in the banner 130. The navigation application has also rotated the map view such that the direction from the current position of the user to the location for the next navigation instruction points to the top side of the screen. The puck 935 is at the same position with respect to the sides of the screen as the position the puck 935 was in the previous stages 905-910.

In the example illustrated in FIG. 9, the user has peeked ahead to view the location for the next navigation instruction only. However, like in the case of 2D navigation, the navigation application of some embodiments allows the user to peek ahead to view as many navigation instructions as possible up to the last navigation instruction of the route being traveled. In such cases, the navigation application performs zooming, rotating and/or panning to display the current location and all the locations for all the future navigation instructions in the screen together.

In some embodiments, the navigation application does not render some of the constructs in the map view in 3D. For instance, the navigation application of some embodiments may render the buildings shown at the stages of FIG. 9 flat. As a result, the map view in these embodiments displays the map view at a perspective angle.

B. Bouncing Back to Navigation View

Figure 10:
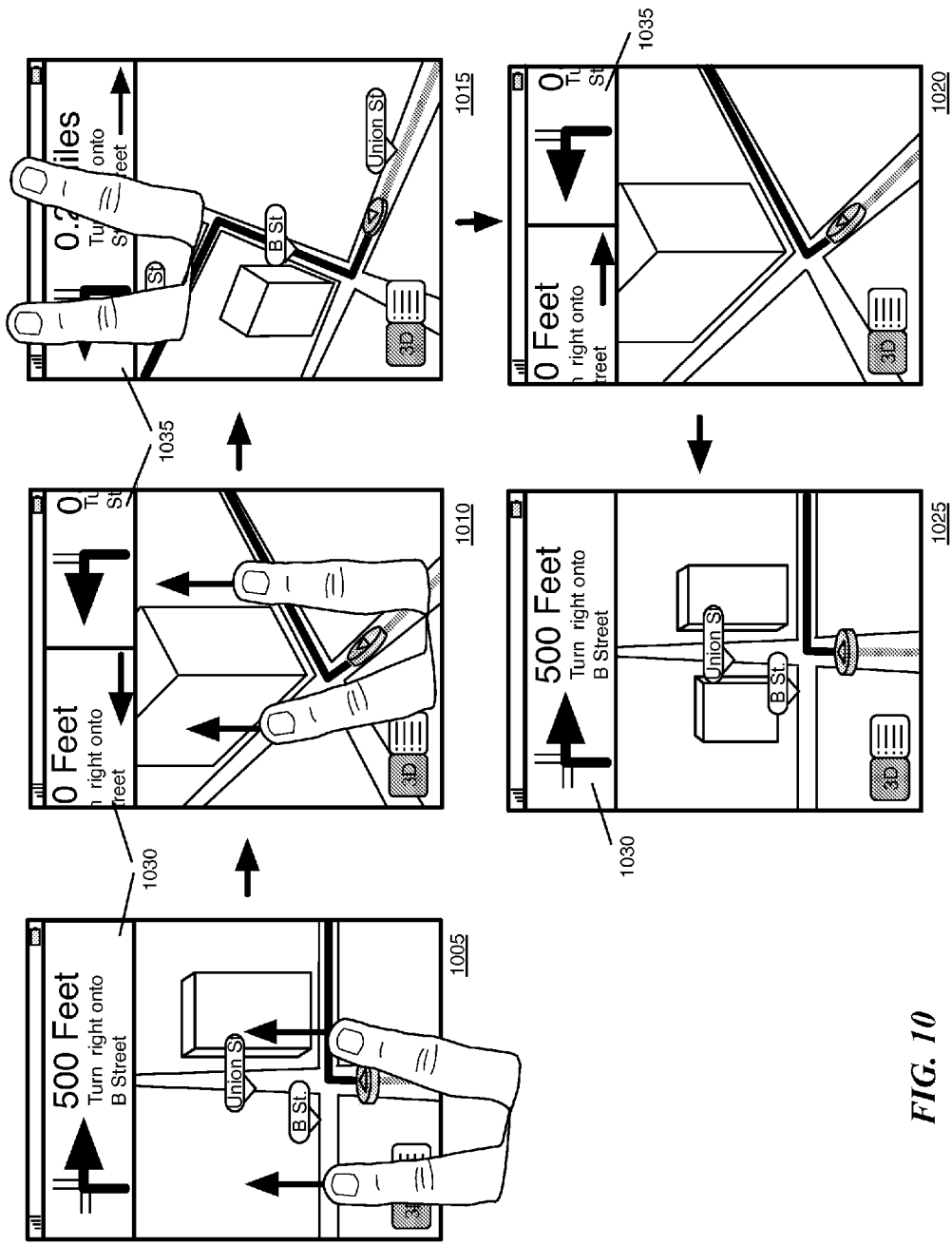
FIG. 10 illustrates that the navigation application of some embodiments bounces a banner back to its original position.

FIG. 10 illustrates that the navigation application of some embodiments bounces a banner back to its original position when the touch on the screen that caused the navigation application to slide the banner out of the screen of a device is removed from the screen. This figure illustrates the bouncing back operation of the navigation application running in the driving mode in terms of five stages 1005-1025.

At the first stage 1005, the navigation application is in the driving mode, displaying the map view for the current navigation instruction in 3D. The navigation application displays a banner 1030 that displays the current navigation instruction of a route being traveled by a user. The user starts swiping up the screen by touching the screen with two fingers and starting to move the fingers up towards the top side of the screen while maintaining the touches.

The second stage 1010 shows that the user has moved up the fingers while maintaining the touches with the screen. As the touches move upward to the top side of the screen, the navigation application has slid the banner 1030 a half way out of the screen to the left and has slid a banner 1035 showing the next navigation instruction of the route a half way into the screen from the right side of the screen. The navigation application has also zoomed out the map view and rotated the map view. However, because the banner 1030 displaying the current navigation instruction has not been completely slid out of the screen, the navigation application displays a partial peek view in 3D. That is, the direction of the vector from the current position of the user to the location for the next navigation instruction is not yet pointing to the top side of the screen. The navigation application has not yet zoomed out enough to display the current position of the user and the location for the next navigation instruction together in the screen. Moreover, the navigation application has not panned the map view enough to display the location of the next navigation instruction in the screen.

The third stage 1015 shows that the user has moved up the touches all the way up to the top edge of the screen and then out of the screen. In response, the navigation application of some embodiments has completely slid the banner 1030 out of the screen and has fully slid in the banner 1035 for the next navigation instruction.

In some embodiments, the navigation application slides out at most one banner per swipe. That is, even if the length of the swipe exceeds a length that is required to slide out a banner, the navigation application does not slide out the banner for the next navigation instruction for the exceeding length. In other embodiments, the navigation application slides out more than one banner per swipe when the length of the swipe exceeds the length that is required to slide out one banner. In such cases, the navigation application slides in a banner for the navigation instruction that is after the next navigation instruction.

In some embodiments, the navigation application considers the speed at which the touches of the swipe move on the screen. In some of these embodiments, when the user performs the swipe faster than a certain threshold speed, the navigation instruction slides out a banner regardless of the length of the swipe. For instance, the navigation of some embodiments slides a banner completely out of the screen and slides in another banner completely even if the length of the swipe that the user has performed is shorter than a length that is required to move a banner, as long as the speed of the swipe is faster than the threshold speed.

At the third stage 1015, the navigation application displays a 3D peek view for the next navigation instruction. That is, the navigation application has zoomed out, panned, and/or rotated the map view such that the current position of the user and the location for the next navigation instruction are displayed in the screen together. The direction of the vector from the current position of the user to the location for the next navigation instruction points to the top side of the screen. The third stage 1015 also shows that the user is no longer maintaining the touch with the screen. The user may have lifted up or have slid one or both of the fingers off the screen.

In some embodiments, the navigation application maintains the 3D peek view or the 3D partial peek view only if the touches (or the near-touches) that caused the navigation application to display the peek view for the next navigation instruction are maintained. When the touches are not maintained (e.g., due to the user's lifting up or sliding out one or more fingers off the screen), the navigation application reverts back to the navigation view for the current navigation instruction from the peek view for the next navigation instruction. That is, the navigation application slides back the banner that displays the current navigation instruction fully back to the screen. The navigation application smoothly rotates back, zooms in, and pans the map view back such that the current direction of the travel points back to the top side of the screen and the current position indicator goes back to the position below the center position of the screen.

The fourth stage 1020 shows the partial peek view in 3D for the current navigation instruction because the navigation application of some embodiments does not discretely revert to the navigation view for the current navigation instruction. Rather, the navigation application smoothly transitions from the peek view for the next navigation instruction to the navigation view. That is, the navigation instruction does not jump back to the navigation view from the peek view without displaying the intermediate partial peek views. In some embodiments, the navigation application of some embodiments animates the map view from the peek view to the navigation view to show the intermediate partial peek views until the navigation view is fully restored.

The fifth stage 1025 shows that the navigation instruction has fully restored the navigation view for the current navigation instruction. Thus, the fifth stage 1025 in this example looks identical to the first stage 1005.

C. Peeking Behind

Figure 11:
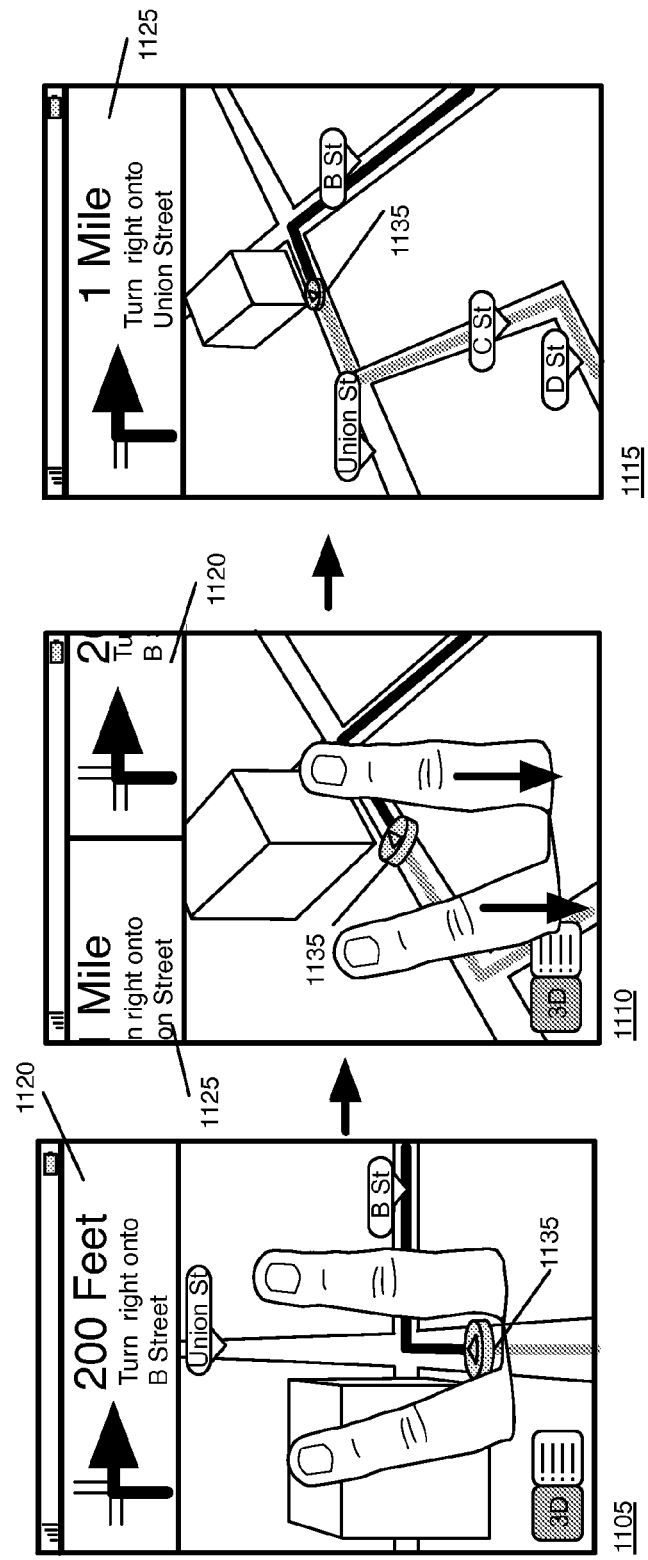
FIG. 11 illustrates that the navigation application of some embodiments allows a user to peek behind the previous instructions for a route that is being presented in the driving mode.

FIG. 11 illustrates that the navigation application of some embodiments allows a user to peek behind the previous instructions for a route that is being presented in the driving mode. This figure illustrates in three stages 1105-1115 that the navigation application displays a location that corresponds to the previous navigation instruction in response to the user's swiping the screen of the device on which the navigation application executes.

The navigation application of some embodiments slides out to one direction (e.g., to the left side of the screen) a banner that displays the current navigation instruction as the user swipes the screen upward to the top side of the screen. The navigation application slides out the banner to another direction (e.g., to the right side of the screen) as the user swipes the screen downward to the bottom side of the screen.

As the banner displaying the current navigation instruction slides out and another banner displaying the previous navigation instruction slides in, the navigation application of some embodiments zooms, pans and/or rotates the map view. The navigation application of some embodiments performs the zooming, panning and/or rotating in such a way that the navigation application displays both the current position of the device and the location that corresponds to the previous navigation instruction in the screen of the device together. In some such embodiments, the navigation application displays the entire previous section of the route, which ends at the location for the previous navigation instruction and begins at the location for the navigation instruction that is prior to the previous navigation instruction in the sequence of navigation instructions for the route. As mentioned above, the navigation application of some embodiments performs the zooming, panning and/or rotating by changing the viewpoint of the virtual camera by moving the camera in the virtual 3D space.

At the first stage 1105, the navigation application displays the navigation view for the current navigation instruction in 3D. The navigation application displays a banner 1120 that displays the current navigation instruction. The navigation application also displays a puck 1130 that indicates the current position of the user who may be driving a car. At this stage 1105, the user starts swiping down the screen by touching the screen with two fingers and starting to move the fingers down to the bottom side of the screen while maintaining the touches.

The second stage 1110 shows that the user has moved down the touches towards the bottom side of the screen. In response, the navigation application has moved the banner 1120 a half way out to the right side of the screen and slide in another banner 1125 that displays the previous navigation instruction from the left side of the screen to follow the banner 1120.

For displaying a full peek view for a previous navigation instruction, the navigation application rotates the map view to make a vector from the location for the previous navigation to the current position of the user point to the top side of the screen. In the example of this figure, this vector (not shown) is from the junction of the C Street and the Union Street to the puck 1135. However, in other embodiments, the navigation application makes a vector, from the beginning of the previous section of the travel, rather than from the end of the previous section of the travel, to the current position of the user, point to the top side of the screen. In the example of this figure, this vector is from the junction of the C Street and the D Street to the puck 1135 as shown at the third stage 1115 because the previous section of the route begins at this junction.

To show the full peek view, the navigation application of some embodiments also pans the map view to move the puck 1135 to a position above the center of the screen as shown at the fourth stage 1115. In this manner, the navigation application visually distinguishes a 3d peek view for a past navigation instruction from a 3D peek view for a future navigation instruction.

At the second stage 1110, as the banner 1120 that displays the current navigation instruction has not been completely slid out of the screen at this stage 1110, the navigation application displays a partial peek view in 3D. That is, the navigation application has not fully rotated the figure to have the direction of the vector from the beginning of the section of the route for the previous navigation instruction (e.g., the section of the route between the location for the previous turn and the location for the turn prior to the previous turn) to the current position of the user to point to the top side of the screen. At the second stage 1115, the navigation application of some embodiments has not zoomed out the map view to display both the current position of the user and the beginning of the previous section of the route.

The third stage 1115 shows that the user has swiped the screen down and out of the screen. In response, the navigation application has completely slid out the banner 1125 and displays the entire banner 1125 that displays the previous navigation instruction. The navigation application displays the full peek view for the previous navigation instruction in 3D.

As shown, the navigation application has fully zoomed out to a zoom level at which the map view display both the current position of the user and the entire previous section of the route. The section of the route for the previous navigation instruction in this example is the portion of the C Street between the junction of the C Street and the Union Street and the junction of the C Street and the D Street. The navigation application has also rotated the map view such that the direction from the beginning of the previous section of the route to the current position of the user points to the top side of the screen. The puck 1135 has moved up to a position above the center of the screen.

In the example illustrated in FIG. 11, the user has peeked behind to view the location for the previous navigation instruction and the previous section of the route only. However, the navigation application of some embodiments allows the user to peek behind to view as many past navigation instructions and sections of the route as possible all the way back to the first navigation instruction of the route. In such cases, the navigation application performs zooming, rotating and panning to display the current location and all the locations for all the previous navigation instructions in the screen together.

D. Responding to Touch Movement

Figure 12:
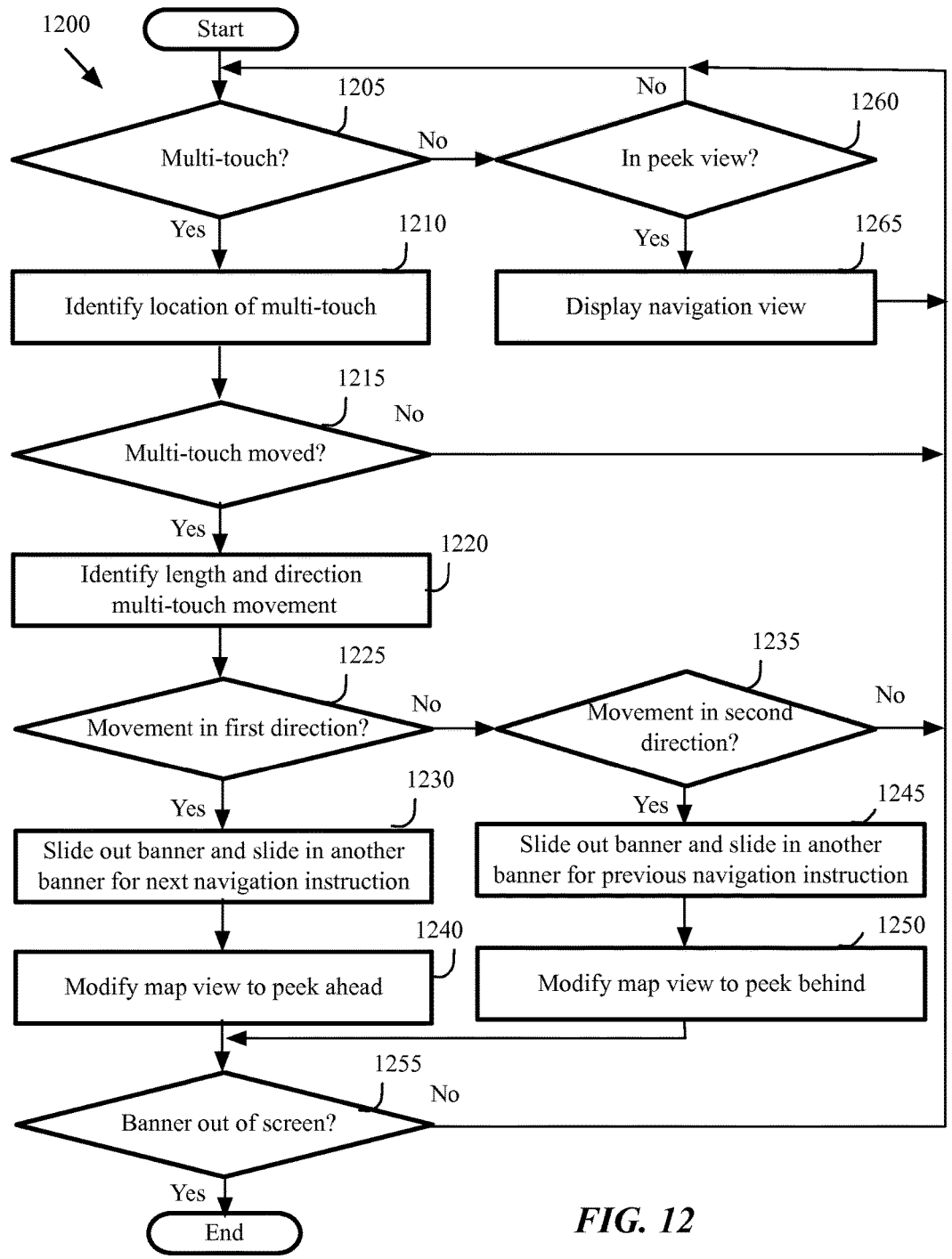
FIG. 12 conceptually illustrates a process that the navigation application in the driving mode performs to present the navigation view for the current navigation instruction of a route and a peek view for the previous or next navigation instruction of the route.

FIG. 12 conceptually illustrates a process 1200 that the navigation application in the driving mode performs to present the navigation view for the current navigation instruction of a route and a peek view for the previous or next navigation instruction of the route. The navigation application of some embodiments performs the process 1200 on a device that has a touch-sensitive screen and/or a near-touch sensitive screen that displays the output of the navigation application. The process 1200 starts when the navigation application is presenting a map view for the route being traveled by a user.

The process 1200 begins by determining (at 1205) whether the user is touching the screen of the device using two or more fingers. In some embodiments, the process 1200 determines whether the user is touching the screen based on the information (e.g., information whether the screen is being touched, coordinates of the touch(es) if the user is touching the screen at one or more locations of the screen, etc.) from a touch interface of the device. When the process 1200 determines (at 1205) that the user is not touching the screen, the process 1200 proceeds to 1260, which is described further below.

When the process 1200 determines (at 1205) that the user is touching the screen using two or more fingers (i.e., a multi-touch), the process 1200 identifies (at 1210) the locations of the touches on the screen. In some embodiments, the process 1200 identifies the locations of the touches on the screen from the information received from the touch interface of the device.

Next, the process 1200 determines (at 1215) whether the multi-touch has moved on the screen. In some embodiments, the process 1200 takes an average coordinates of the touches in the multi-touch to measure the movement. In other embodiments, the process 1200 selects one of the touches to measure the movement. In some embodiments, the process 1200 keeps track of the locations of the touches while the touches are maintained with the screen. The process 1200 determines that the touches are moving on the screen when the locations of the touches are changing while the touches are maintained.

When the process 1200 determines (at 1215) that the touches have not moved on the screen, the process 1200 loops back to 1205 to check whether all of the touches are maintained with the screen. When the process 1200 determines (at 1215) that the touches have moved on the screen, the process 1200 identifies (at 1220) the length and the direction of the movement that the touches have made. In some embodiments, the process 1200 identifies a vector on the coordinate system of the screen that represents the movement of the touches and identifies only the vertical component (e.g., a y-component) of the vector as the length of the movement. In some such embodiments, the process 1200 identifies the length of the vertical component of the vector as zero when the vector is not substantially parallel to a vertical line on the screen's coordinate system (e.g., not within 40 degrees with respect to a vertical line of the screen). That is, the process 1200 ignores the movement of the touches if the movement is not considered a vertical multi-touch swipe on the screen.

The process 1200 then determines (at 1225) whether the movement of the touches is in a first direction (e.g., to the top side of the screen). As mentioned above, the process 1200 of some embodiments considers only the vertical component of the vector that represents the movement. The process 1200 of these embodiments determines whether the movement of the touches is in the first direction based on the direction of the vertical component of the vector.

When the process 1200 determines (at 1225) that the movement of the touches is not in the first direction, the process 1200 proceeds to 1235, which is described further below. When the process 1200 determines (at 1225) that the movement of the touches is in the first direction, the process at 1230 slides out the banner and slides in another banner that displays the next navigation instruction of the route. The process 1200 slides out the banner by a length that is proportional to the length of the movement of the touches. As the process 1200 slide out the banner, the process 1200 also modifies (at 1240) the map view to display a peek view for peeking ahead the next navigation instruction. The process in some embodiments modifies the map view by rotating, zooming and/or panning the map view such that (1) a vector, from the current location of the user to the location of the next navigation instruction (i.e., the end of the section of the route for the next navigation instruction), points to the top side of the screen and (2) both the current position of the user and the location for the next navigation instruction are displayed in the screen together. The process then proceeds to 1255, which is described further below.

When the process 1200 determines (at 1225) that the movement of the touches is not in the first direction, the process 1200 determines (at 1235) whether the movement of the touches is in the second direction. In some embodiments, the first and second directions are the opposite directions to each other. When the process 1200 determines (at 1235) that the movement of the touches is not in the second direction, the movement of the touches is neither in the first direction nor in the second direction. That is, the movement is deemed to have a zero length or is not considered as a vertical movement. In such cases, the process 1200 loops back to 1205 to check whether all of the touches are maintained with the screen.

When the process 1200 determines (at 1235) that the movement of the touches is in the second direction, the process at 1245 slides out the banner and slides in another banner that displays the previous navigation instruction of the route. The process 1200 slides out the banner by a length that is proportional to the length of the movement of the touches. As the process 1200 slide out the banner, the process 1200 also modifies (at 1250) the map view to display a peek view for peeking behind.

The process in some embodiments modifies the map view by rotating, zooming and/or panning the map view such that (1) a vector, from the beginning of the section of the route for the previous navigation instruction to the current location of the user, points to the top side of the screen and (2) both the current position of the user and the beginning of the section for the previous navigation instruction are displayed in the screen together. The process in other embodiments modifies the map view by rotating, zooming and/or panning the map view such that (1) a vector, from the location for the previous navigation instruction to the current location of the user, points to the top side of the screen and (2) both the current position of the user and the location for the previous navigation instruction are displayed in the screen together.

The process then determines (at 1255) whether the banner displaying the current navigation instruction has been slid out of the screen. When the process determines (at 1255) that the banner has not been slid out of the screen, the process loops back to 1205 to check whether the touches are maintained with the screen. Otherwise the process ends.

When the process 1200 determines (at 1205) that the user is not touching the screen using two or more fingers, the process 1200 of some embodiments determines (at 1260) whether a peek view is being displayed in the screen. That is, the process 1200 determines whether the process has rotated, zoomed out, and/or panned the map view for the next or previous navigation instruction. When the process determines (at 1260) that the peek view is being displayed, the process bounces back to the navigation view from the current navigation instruction. This is because the touches are no longer maintained and the process of some embodiments bounces back to the navigation view from the peek view when the touches are not maintained. When the process 1200 determines (at 1260) that the peek view is not being displayed, the process 1200 loops back to 1205 to check whether the user touches the screen.

E. Automatically Reverting to Navigation View

Figure 13:
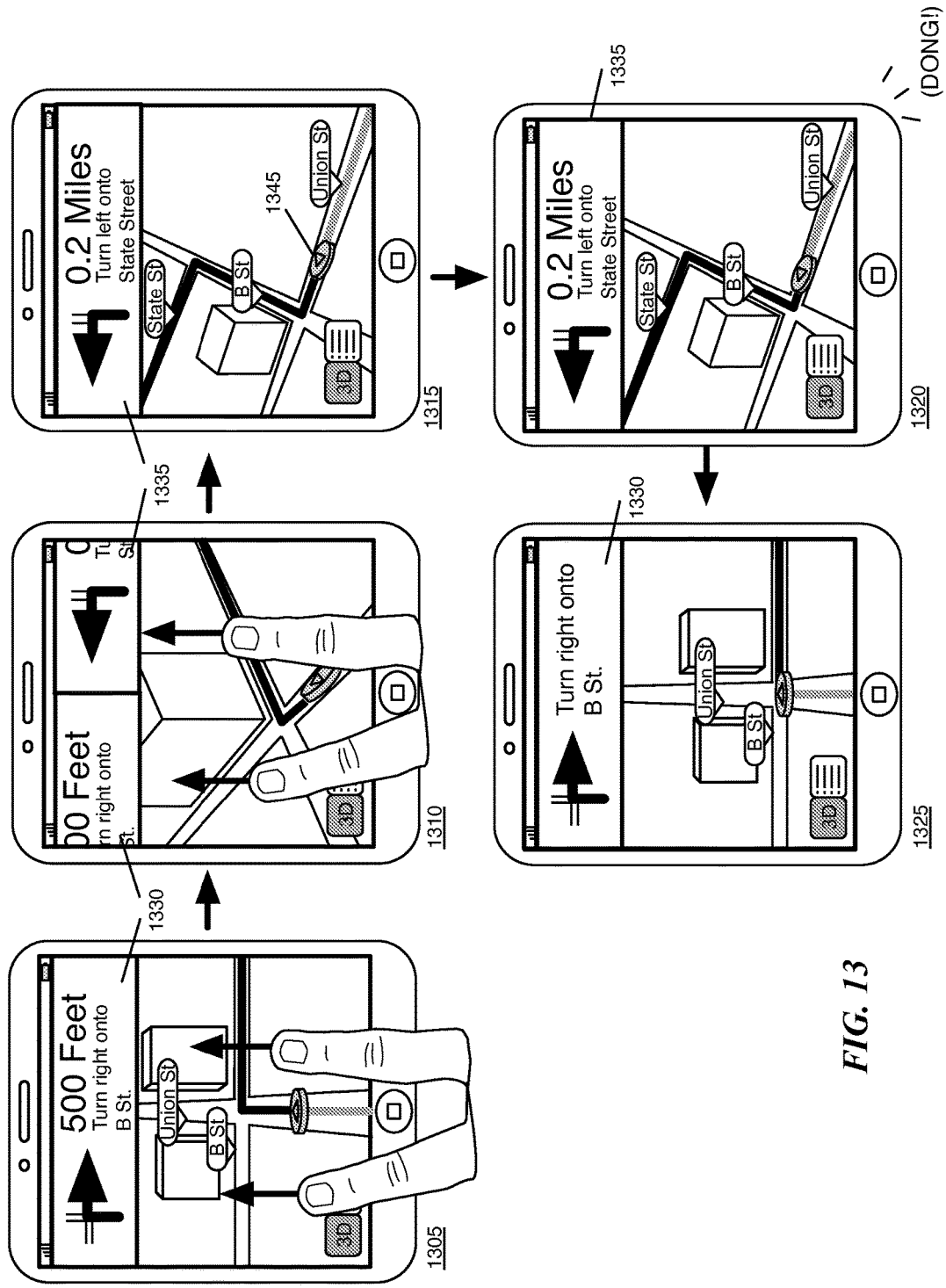
FIG. 13 illustrates that the navigation application of some embodiments backs out from a peek view for the next navigation instruction of a route being traveled by a user and automatically reverts to a navigation view for the current navigation instruction of the route.

FIG. 13 illustrates that the navigation application of some embodiments backs out from a peek view for the next navigation instruction of a route being traveled by a user and automatically reverts to a navigation view for the current navigation instruction of the route. Specifically, this figure illustrates in five stages 1305-1325 that the navigation instruction presenting the map view in the driving mode automatically reverts to the navigation view when the user moves close to or arrives at a location for the current navigation instruction.

The first and second stages 1305 and 1310 are similar to the first and second stages 1005 and 1010 described above by reference to FIG. 10. That is, at the first and second stages 1305 and 1310, the navigation application has moved a banner 1330, which displays the current navigation instruction for the current location of the user, a half way out to the left side of the screen. At the second stage 1310, the navigation application displays a partial peek view for the next navigation instruction.

At the third stage 1315, like at the third stage 1015 of FIG. 10, the navigation instruction displays the full peek view for the next navigation instruction in 3D. However, in contrast to the navigation application of some embodiments at the third stage 1015 of FIG. 10, the navigation application of some embodiments at the third stage 1315 does not start restoring the navigation view for the current navigation instruction even if the touches are not maintained with the screen. The navigation application of these embodiments keeps the peek view for the next instruction even if the touches are not maintained. Moreover, the navigation application of some of these embodiments updates the position of the current position indicator (e.g., a puck 1345) in the peek view.

The fourth stage 1320 shows that the navigation application still displays the peek view for the next navigation instruction. The user has moved closer to the location for the right turn as indicated by the position of the puck 1345 in the map that is closer to the junction of the Union Street and the B Street than the position of the puck 1345 was at the previous stage 1315. In some embodiments, the navigation instruction notifies the user of an imminent turn when the position of the user falls within a threshold distance from the location for the turn. For instance, the navigation application of some embodiments at the fourth stage 1320 presents a short audible notification (e.g., a short audible sound such as "dong") to the user to notify the user of the imminent turn.

In some embodiments, the navigation application uses different short audible notifications for different directions of turns. For instance, the notification uses "ding" for one of the left turn or the right turn and "dong" for the other directional turn.

Moreover, in some embodiments, the navigation application in the driving mode uses different threshold distance based on the speed of the car that the user is driving. That is, in some embodiments, the navigation application uses a longer threshold distance (e.g., a mile) when the user moves fast (e.g., at 60 miles per hour) and a shorter threshold distance (e.g., 500 feet) when the user moves relatively slowly (e.g., at 20 miles per hour). This is because the navigation application of these embodiments differentiates between a highway driving condition and a city driving condition.

When the user reaches the location for the current navigation instruction, the navigation application of some embodiments automatically reverts back to the navigation view for the current navigation instruction. As shown at the fifth stage 1325, the navigation application reverts to the navigation view for the current navigation instruction as the user arrives at the location for the right turn onto the B Street. The navigation application of some embodiments also updates the content displayed on the banner 1330 for the current navigation instruction. For instance, as shown, the navigation application does not display the remaining distance to the location of the turn because the user has reached the location for the turn.

Figure 14:
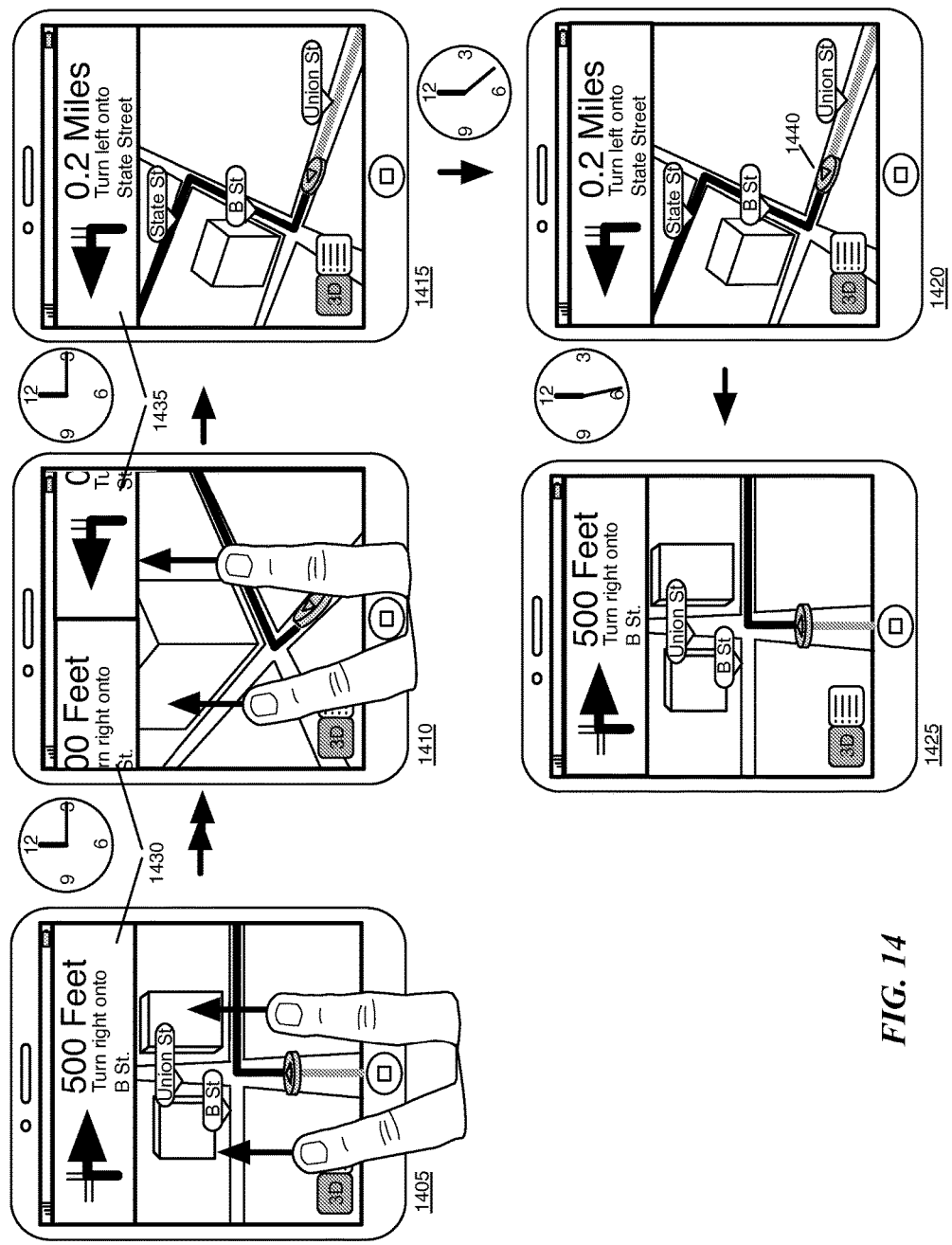
FIG. 14 illustrates another situation in which the navigation application of some embodiments automatically reverts to the navigation view for the current navigation instruction of a route from the peek view for the next navigation instruction of the route.

FIG. 14 illustrates another situation in which the navigation application of some embodiments automatically reverts to the navigation view for the current navigation instruction of a route from the peek view for the next navigation instruction of the route. Specifically, this figure illustrates in terms of five stages 1405-1425 that the navigation application backs out from the peek view and automatically reverts to the navigation view when a defined period of time elapses. This figures also conceptually illustrates a clock after each of the first four stages 1405-1420 to indicate the time at which the stage ends.

At the first stage 1405, the navigation application displays a banner 1430 that displays the current navigation instruction of a route being traveled by a user. The map view is displayed in 3D as the navigation application is in the driving mode. The user starts swiping up the screen using two fingers. The navigation application advances to the next stage 1410 at 12:15 PM as indicated by the clock depicted between the stages 1405 and 1410.

The second stage 1410 shows that the user has moved up the fingers while maintaining the touches with the screen. In response, the navigation application has slid the banner 1430 a half way out to the left side of the screen and has slid a banner 1435, which shows the next navigation instruction of the route, a half way into the screen from the right side of the screen. The navigation application displays a partial peek view in 3D for the next navigation instruction because the banner 1430 has been slid out only a half a way. The navigation application advances to the next stage 1415 at 12:15 PM as indicated by the clock depicted between the stages 1410 and 1415.

At the third stage 1415, the navigation instruction displays the full peek view in 3D for the next navigation instruction. The banner 1435 displaying the next navigation instruction is fully displayed as the banner 1430 displaying the current navigation is completely slid out of the screen. The navigation application advances to the next stage 1420 at around 12:25 PM as indicated by the clock depicted between the stages 1415 and 1420.

The fourth stage 1420 shows that the navigation application still displays the peek view for the next navigation instruction. The user has not moved from the position at which the user was at the previous stage 1415. The user stops moving and maintains the position as indicated by the current position indicator 1440. The navigation application advances to the next stage 1425 at around 12:29 PM as indicated by the clock depicted between the stages 1420 and 1425.

As mentioned above, the navigation application of some embodiments reverts to the navigation view for the current navigation instruction from the peek view for the future or past navigation instructions when a defined period of time elapses while the navigation application is displaying the peek view. In some embodiments, this period of time in the driving mode is set to a period of time (e.g., one minute) that is much shorter than the period of time to revert to the navigation view in the pedestrian mode. The fifth stage 1425 shows that the navigation application of some embodiments has reverted back to the 3D navigation view for the current navigation instruction because more than the defined period of time is lapsed (e.g., from 12:25 PM to 12:29 PM) while the navigation application displays the peek view.

III. Software Architecture

Figure 15:
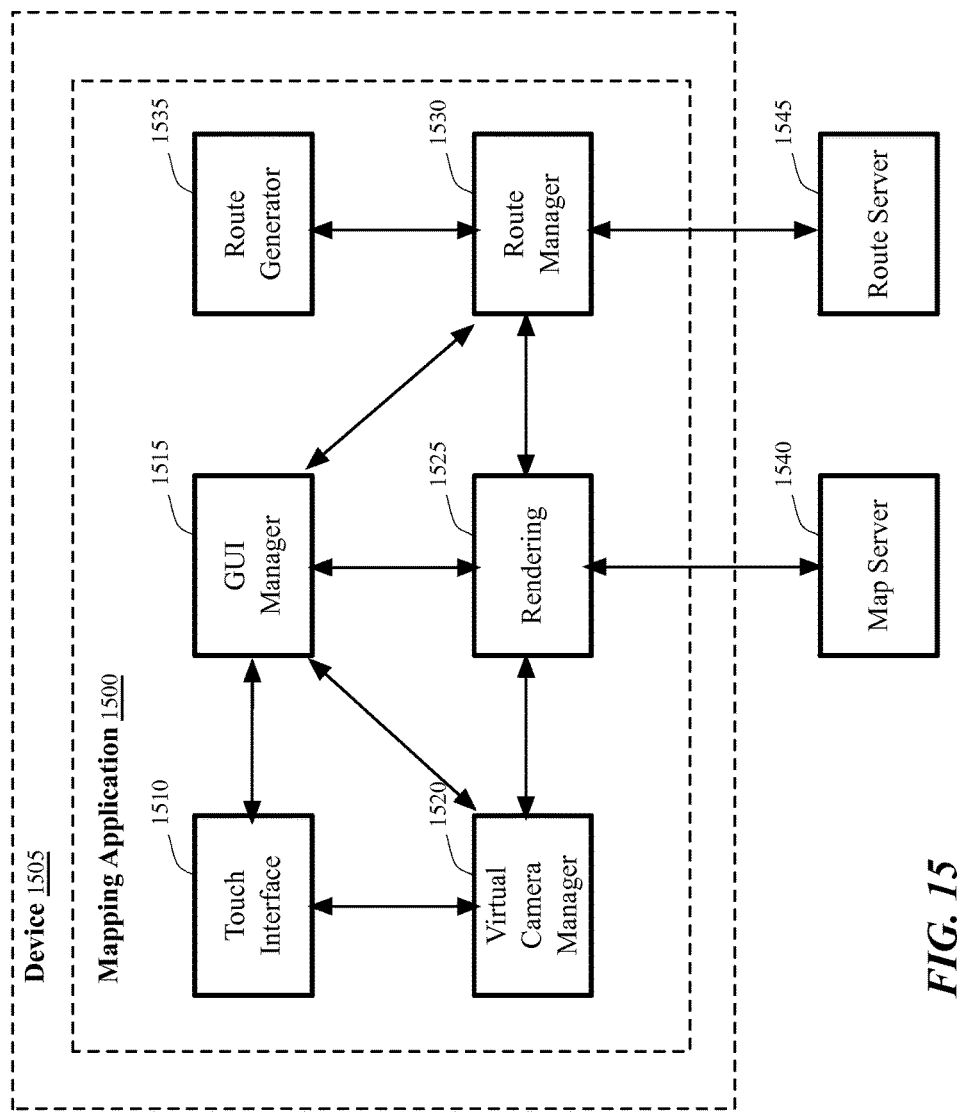
FIG. 15 illustrates example architecture of a navigation application that allows the user to peek ahead and behind a route.

FIG. 15 illustrates example architecture of a navigation application that allows the user to peek ahead and behind a route. In this example, a navigation application 1500 of some embodiments runs in a device 1505. As shown, the navigation application 1500 includes a touch interface 1510, a GUI manger 1515, a virtual camera manager 1520, a rendering module 1525, a route manager 1530, and a route generator 1535. This figure also illustrates a map server 1540 and a route server 1545.

The device 1505 of some embodiments has a touch-sensitive screen (not shown) and/or a near-touch sensitive screen (not shown) that displays the output of the navigation application 1500. The device 1505 also facilitates the interaction between the navigation application and the map server 1540 and the route server 1545. In this figure, the device's own hardware and software architecture is not depicted for the simplicity of description and illustration. More details about a device on which the navigation application may execute will be described further below by reference to FIG. 16.

The map server 1540 is a remote server that provides map data to the navigation application 1500 that describes relative locations of streets, highways, points of interest, etc., in the map per the navigation application 1500's request. The map data contains 2D and 3D map data at different zoom levels and perspectives.

The route server 1545 is a remote server that provides route data to the navigation application 1500 upon request. In some embodiments, the navigation application 1500 sends information about a starting location and a destination location to the router server 1545. The route server 1545 of some embodiments computes a set of routes for different modes of transportation and returns the routes to the navigation application 1500.

The route manager 1530 of the navigation application receives information about starting and destination locations and sends the information to the router server 1545 or to the route generator 1535 to obtain routes that includes sets of navigation instructions. In some embodiments, the route manager 1530 receives the information from the user through the GUI manager 1515, which receives user selection/or specification through GUI items that the GUI manager 1515 manages. The route manager 1530 of some embodiments uses one or both of the route generator 1535 and the route server 1545 to obtain the routes. The router manager 1530 of some embodiments also makes the default selection of a route and keeps track of the default mode of transportation.

The route generator 1535 generates routes based on the information about the starting and ending locations from the route manager. The route generator 1535 is a local equivalent of the route server 1545. The route generator 1535 is part of the navigation application 1500 in some embodiments. In some embodiments, however, the route generator 1535 is a stand-alone application that executes on the device 1505.

The touch interface 1510 receives the user's interaction with the screen (not shown) of the device 1505. In some embodiments, the touch interface 1510 receives touch information (e.g., coordinates of the part of the screen that sensed a touch). The touch interface 1510 analyzes the information and determines whether the information can be interpreted meaningful gestures such vertical/horizontal swipes, whether there has been a multi-touch, etc. The touch interface 1510 sends the analysis of the touch information to the virtual camera manager 1520 and/or the GUI manager 1515.

The GUI manager 1515 manages a set of GUI items. The GUI manager receives the analysis of the touch information from the touch interface 1510 and determines whether the analysis affects any of the GUI items that the GUI manager 1515 manages. For instance, when the touch interface informs that a touch is moving on the display area, the GUI manager determines whether the touch is on a banner showing a navigation instruction and moves the banner accordingly if the touch is on the banner. The GUI manager 1515 informs the virtual camera manager 1520 of the movements of the banner.

The GUI manager 1515 also interacts with the route manager 1530. As mentioned above, the GUI manager 1515 provides the route manager with the user-specified information about routes to generate. The GUI manager 1515 also requests and receives navigation instructions and generates rendering instructions for drawing banners in the display area. The GUI passes the rendering instructions to the rendering module 1525 so that the rendering module 1525 renders the banner in the display area. The GUI manager 1515 generates rendering instructions for drawing other GUI items (e.g., an end control, a list control, route selection banners, etc.) in the display area. The GUI manager 1515 also generates rendering instructions based on the user's interaction with the GUI items.

The virtual camera manager 1520 receives information about the movement of banners from the GUI manger 1515 and translates them into a movement of the virtual camera. This movement of virtual camera includes instructions for zooming, rotating, and/or panning instructions. The virtual camera manager 1520 sends these instructions to the rendering module so that the rendering module can draw the changing map views in the display area.

In some embodiments, the virtual camera manager receive the analysis of the touch input from the touch interface 1510 and moves the virtual camera accordingly. In these embodiments, the virtual camera manager 1510 informs the GUI manager 1515 so that the GUI manager 1515 can determine whether any of the GUI items that the GUI manager are affected by the movement of the virtual camera.

The rendering module 1525 receives rendering instructions from the GUI manager 1515, the virtual camera manager 1520, and/or the route manager 1530. The rendering module 1525 also obtains map data from the map server 1540. The rendering module 1525 draws map views, routes, GUI items, etc. according to the instructions and map data.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 16:
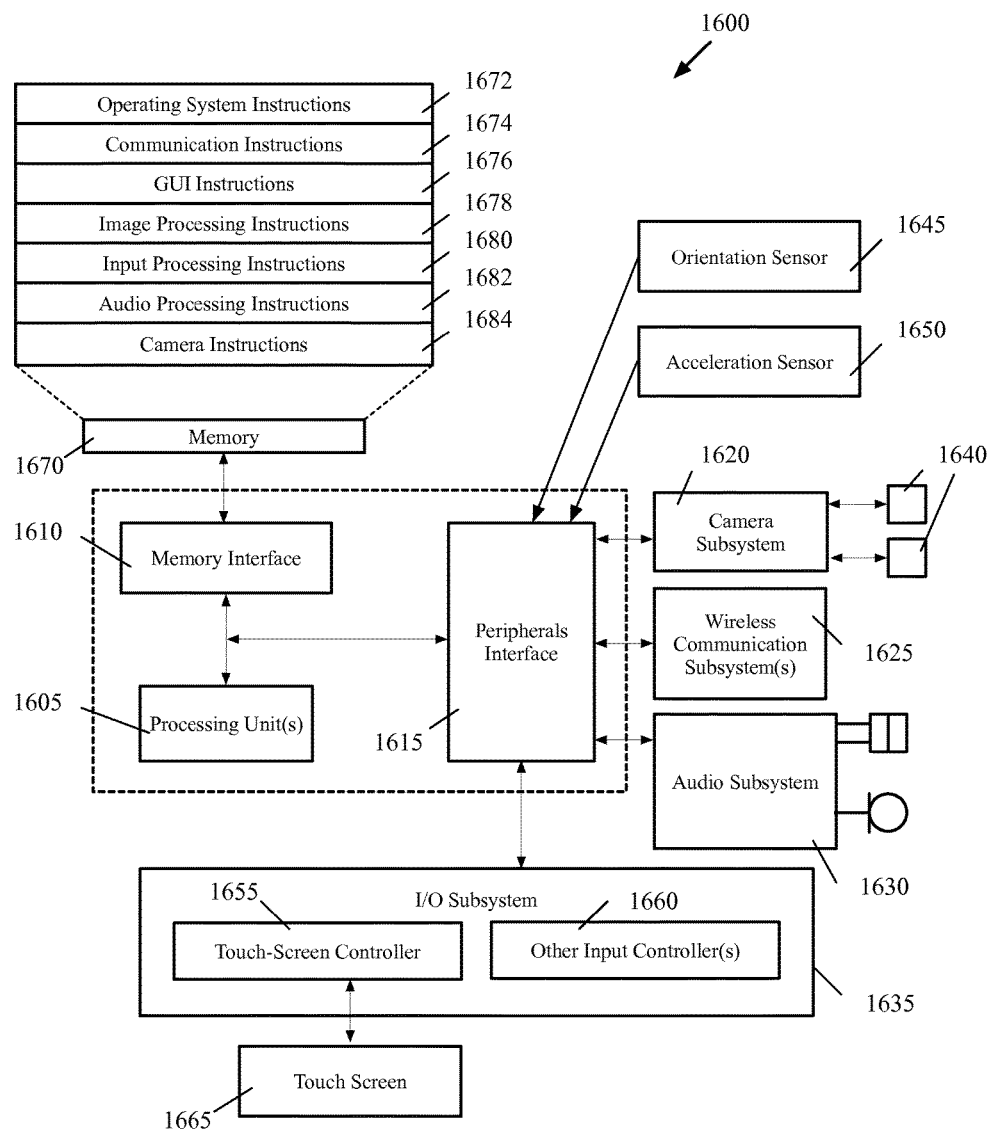
FIG. 16 is an example of an architecture of a mobile computing device of some embodiments.

The mapping and navigation applications of some embodiments operate on mobile devices, such as smart phones (e.g., iPhones®) and tablets (e.g., iPads®). FIG. 16 is an example of an architecture 1600 of such a mobile computing device. Examples of mobile computing devices include smartphones, tablets, laptops, etc. As shown, the mobile computing device 1600 includes one or more processing units 1605, a memory interface 1610 and a peripherals interface 1615.

The peripherals interface 1615 is coupled to various sensors and subsystems, including a camera subsystem 1620, a wireless communication subsystem(s) 1625, an audio subsystem 1630, an I/O subsystem 1635, etc. The peripherals interface 1615 enables communication between the processing units 1605 and various peripherals. For example, an orientation sensor 1645 (e.g., a gyroscope) and an acceleration sensor 1650 (e.g., an accelerometer) is coupled to the peripherals interface 1615 to facilitate orientation and acceleration functions.

The camera subsystem 1620 is coupled to one or more optical sensors 1640 (e.g., a charged coupled device (CCD) optical sensor, a complementary metal-oxide-semiconductor (CMOS) optical sensor, etc.). The camera subsystem 1620 coupled with the optical sensors 1640 facilitates camera functions, such as image and/or video data capturing. The wireless communication subsystem 1625 serves to facilitate communication functions. In some embodiments, the wireless communication subsystem 1625 includes radio frequency receivers and transmitters, and optical receivers and transmitters (not shown in FIG. 16). These receivers and transmitters of some embodiments are implemented to operate over one or more communication networks such as a GSM network, a Wi-Fi network, a Bluetooth network, etc. The audio subsystem 1630 is coupled to a speaker to output audio (e.g., to output voice navigation instructions). Additionally, the audio subsystem 1630 is coupled to a microphone to facilitate voice-enabled functions, such as voice recognition (e.g., for searching), digital recording, etc.

The I/O subsystem 1635 involves the transfer between input/output peripheral devices, such as a display, a touch screen, etc., and the data bus of the processing units 1605 through the peripherals interface 1615. The I/O subsystem 1635 includes a touch-screen controller 1655 and other input controllers 1660 to facilitate the transfer between input/output peripheral devices and the data bus of the processing units 1605. As shown, the touch-screen controller 1655 is coupled to a touch screen 1665. The touch-screen controller 1655 detects contact and movement on the touch screen 1665 using any of multiple touch sensitivity technologies. The other input controllers 1660 are coupled to other input/control devices, such as one or more buttons. Some embodiments include a near-touch sensitive screen and a corresponding controller that can detect near-touch interactions instead of or in addition to touch interactions.

The memory interface 1610 is coupled to memory 1670. In some embodiments, the memory 1670 includes volatile memory (e.g., high-speed random access memory), non-volatile memory (e.g., flash memory), a combination of volatile and non-volatile memory, and/or any other type of memory. As illustrated in FIG. 16, the memory 1670 stores an operating system (OS) 1672. The OS 1672 includes instructions for handling basic system services and for performing hardware dependent tasks.

The memory 1670 also includes communication instructions 1674 to facilitate communicating with one or more additional devices; graphical user interface instructions 1676 to facilitate graphic user interface processing; image processing instructions 1678 to facilitate image-related processing and functions; input processing instructions 1680 to facilitate input-related (e.g., touch input) processes and functions; audio processing instructions 1682 to facilitate audio-related processes and functions; and camera instructions 1684 to facilitate camera-related processes and functions. The instructions described above are merely exemplary and the memory 1670 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 16 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 16 may be split into two or more integrated circuits.

B. Electronic System

Figure 17:
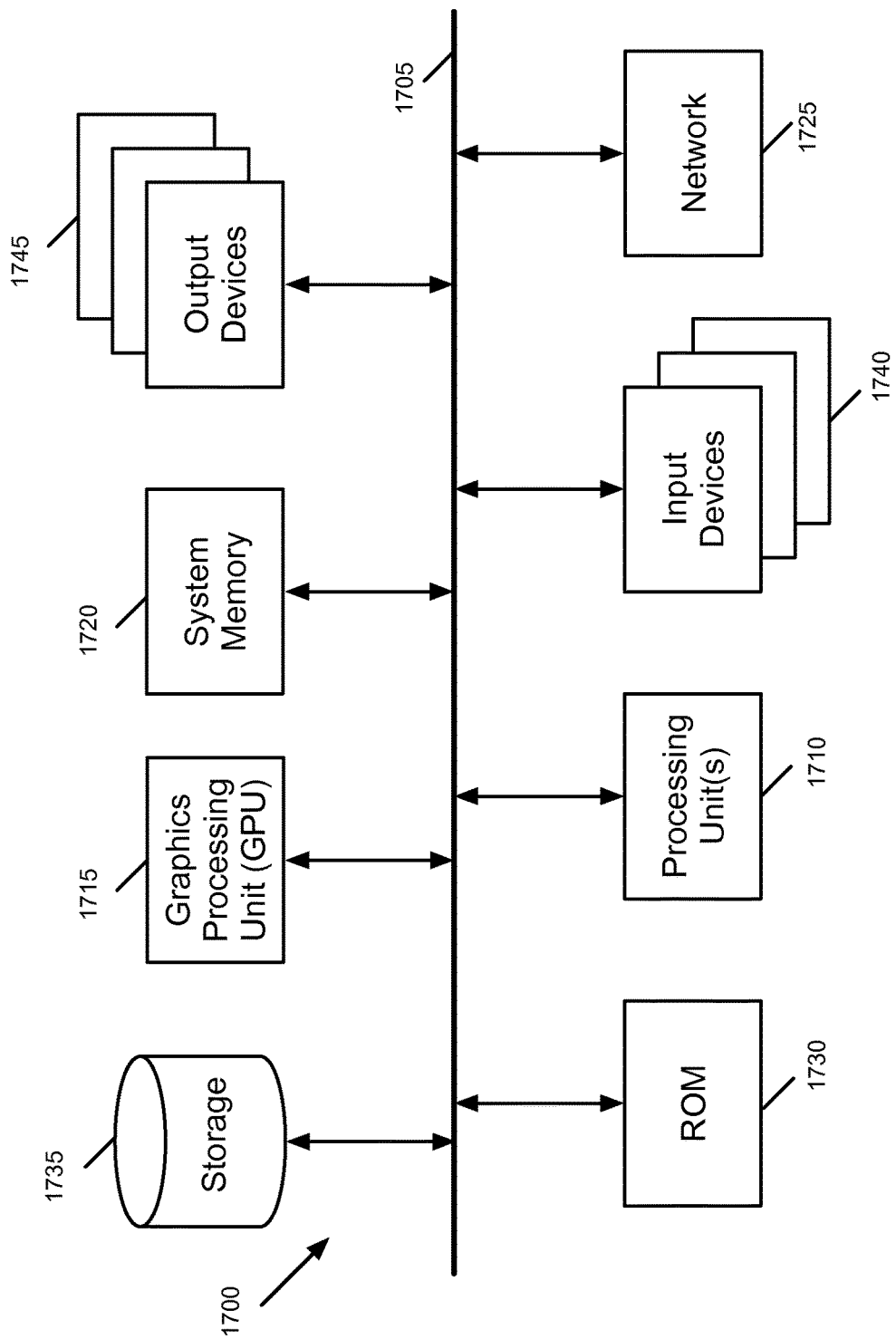
FIG. 17 conceptually illustrates an example of an electronic system with which some embodiments of the invention are implemented.

FIG. 17 conceptually illustrates another example of an electronic system 1700 with which some embodiments of the invention are implemented. The electronic system 1700 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1700 includes a bus 1705, processing unit(s) 1710, a graphics processing unit (GPU) 1715, a system memory 1720, a network 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the GPU 1715, the system memory 1720, and the permanent storage device 1735.

From these various memory units, the processing unit(s) 1710 retrieves instructions to execute and data to process in order to execute the processes of the invention. The processing unit(s) may be a single processor or a multi-core processor in different embodiments. Some instructions are passed to and executed by the GPU 1715. The GPU 1715 can offload various computations or complement the image processing provided by the processing unit(s) 1710. In some embodiments, such functionality can be provided using CoreImage's kernel shading language.

The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive, integrated flash memory) as the permanent storage device 1735.

Other embodiments use a removable storage device (such as a floppy disk, flash memory device, etc., and its corresponding drive) as the permanent storage device. Like the permanent storage device 1735, the system memory 1720 is a read-and-write memory device. However, unlike storage device 1735, the system memory 1720 is a volatile read-and-write memory, such a random access memory. The system memory 1720 stores some of the instructions and data that the processor needs at runtime. In some embodiments, the invention's processes are stored in the system memory 1720, the permanent storage device 1735, and/or the read-only memory 1730. For example, the various memory units include instructions for processing multimedia clips in accordance with some embodiments. From these various memory units, the processing unit(s) 1710 retrieves instructions to execute and data to process in order to execute the processes of some embodiments.

The bus 1705 also connects to the input and output devices 1740 and 1745. The input devices 1740 enable the user to communicate information and select commands to the electronic system. The input devices 1740 include alpha-numeric keyboards and pointing devices (also called "cursor control devices"), cameras (e.g., webcams), microphones or similar devices for receiving voice commands, etc. The output devices 1745 display images generated by the electronic system or otherwise output data. The output devices 1745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet), or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

V. Map Service Environment

Figure 18:
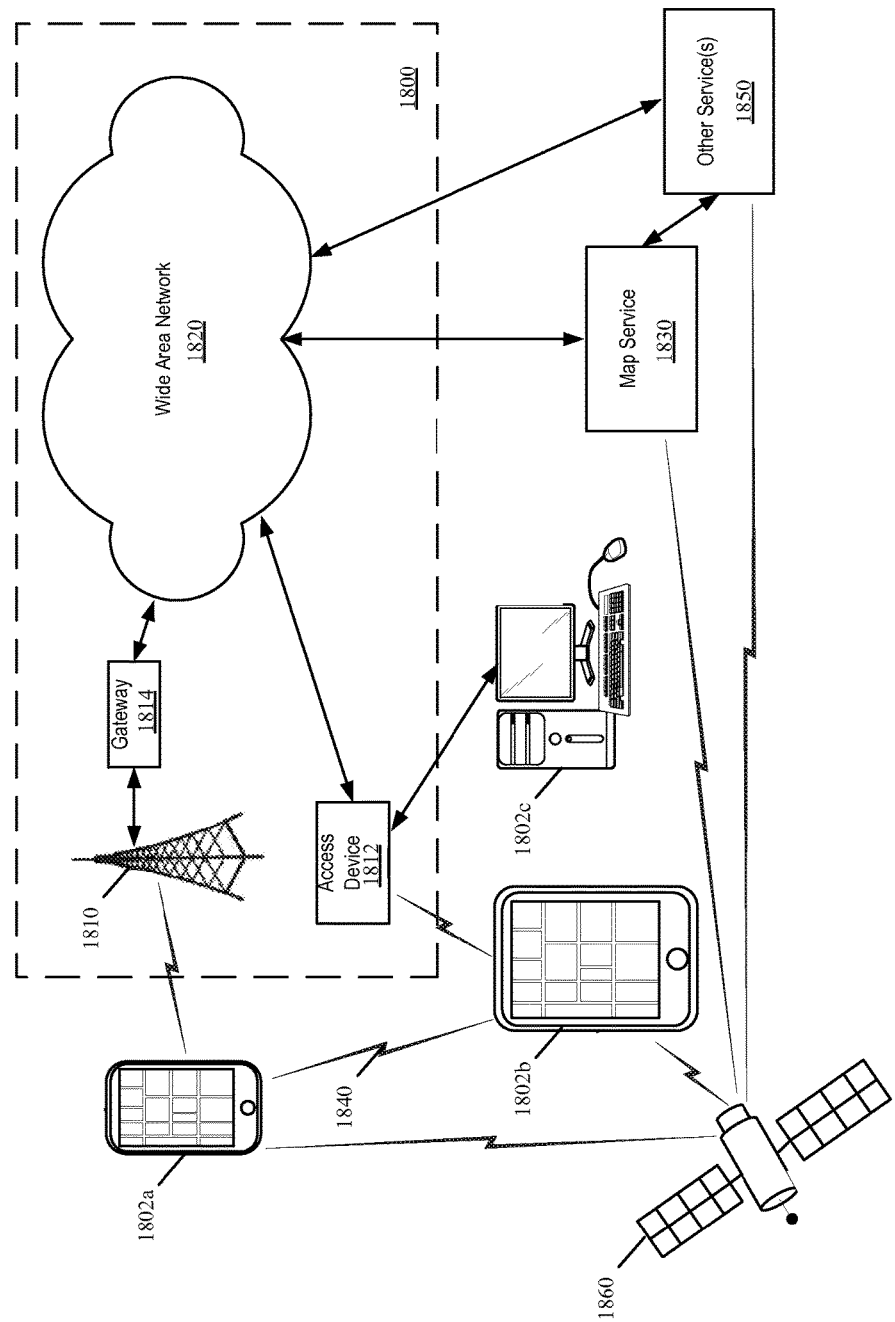
FIG. 18 illustrates a map service operating environment, according to some embodiments.

Various embodiments may operate within a map service operating environment. FIG. 18 illustrates a map service operating environment, according to some embodiments. A map service 1830 (also referred to as mapping service) may provide map services for one or more client devices 1802a-1802c in communication with the map service 1830 through various communication methods and protocols. A map service 1830 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device is currently located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 1802a-1802c may utilize these map services by obtaining map service data. Client devices 1802a-1802c may implement various techniques to process map service data. Client devices 1802a-1802c may then provide map services to various entities, including, but not limited to, users, internal software or hardware modules, and/or other systems or devices external to the client devices 1802a-1802c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be for a specific maps or portions of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, requests for current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and, as such, the above examples are not intended to be limiting.

Various embodiments of client devices (e.g., client devices 1802a-1802c) are implemented on different portable-multifunction device types. Client devices 1802a-1802c utilize map service 1830 through various communication methods and protocols. In some embodiments, client devices 1802a-1802c obtain map service data from map service 1830. Client devices 1802a-1802c request or receive map service data. Client devices 1802a-1802c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. In some embodiments, the client devices allow the device to adjust the virtual camera display orientation to bias toward the route destination. Some embodiments also allow the virtual camera to navigate turns by simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet, which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 18 illustrates one possible embodiment of an operating environment 1800 for a map service 1830 and client devices 1802a-1802c. In some embodiments, devices 1802a, 1802b, and 1802c communicate over one or more wire or wireless networks 1810. For example, wireless network 1810, such as a cellular network, can communicate with a wide area network (WAN) 1820, such as the Internet, by use of gateway 1814. A gateway 1814 in some embodiments provides a packet oriented mobile data service, such as General Packet Radio Service (GPRS), or other mobile data service allowing wireless networks to transmit data to other networks, such as wide area network 1820. Likewise, access device 1812 (e.g., IEEE 802.11g wireless access device) provides communication access to WAN 1820.

Devices 1802a and 1802b can be any portable electronic or computing device capable of communicating with a map service. Device 1802c can be any non-portable electronic or computing device capable of communicating with a map service.

In some embodiments, both voice and data communications are established over wireless network 1810 and access device 1812. For instance, device 1802a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1810, gateway 1814, and WAN 1820 (e.g., using Transmission Control Protocol/Internet Protocol (TCP/IP) or User Datagram Protocol (UDP)). Likewise, in some implementations, devices 1802b and 1802c can place and receive phone calls, send and receive e-mail messages, and retrieve electronic documents over access device 1812 and WAN 1820. In various embodiments, any of the illustrated client devices may communicate with map service 1830 and/or other service(s) 1850 using a persistent connection established in accordance with one or more security protocols, such as the Secure Sockets Layer (SSL) protocol or the Transport Layer Security (TLS) protocol.

Devices 1802a and 1802b can also establish communications by other means. For example, wireless device 1802a can communicate with other wireless devices (e.g., other devices 1802b, cell phones, etc.) over the wireless network 1810. Likewise devices 1802a and 1802b can establish peer-to-peer communications 1840 (e.g., a personal area network) by use of one or more communication subsystems, such as Bluetooth® communication from Bluetooth Special Interest Group, Inc. of Kirkland, Wash. Device 1802c can also establish peer to peer communications with devices 1802a or 1802b (not shown). Other communication protocols and topologies can also be implemented. Devices 1802a and 1802b may also receive Global Positioning Satellite (GPS) signals from GPS satellites 1860.

Devices 1802a, 1802b, and 1802c can communicate with map service 1830 over one or more wired and/or wireless networks, 1812 or 1810. For instance, map service 1830 can provide map service data to rendering devices 1802a, 1802b, and 1802c. Map service 1830 may also communicate with other services 1850 to obtain data to implement map services. Map service 1830 and other services 1850 may also receive GPS signals from GPS satellites 1860.

In various embodiments, map service 1830 and/or other service(s) 1850 are configured to process search requests from any of the client devices. Search requests may include but are not limited to queries for businesses, addresses, residential locations, points of interest, or some combination thereof. Map service 1830 and/or other service(s) 1850 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1830 and/or other service(s) 1850 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1830 and/or other service(s) 1850, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1830 and/or other service(s) 1850 provide one or more feedback mechanisms to receive feedback from client devices 1802a-1802c. For instance, client devices may provide feedback on search results to map service 1830 and/or other service(s) 1850 (e.g., feedback specifying ratings, reviews, temporary or permanent business closures, errors etc.); this feedback may be used to update information about points of interest in order to provide more accurate or more up-to-date search results in the future. In some embodiments, map service 1830 and/or other service(s) 1850 may provide testing information to the client device (e.g., an A/B test) to determine which search results are best. For instance, at random intervals, the client device may receive and present two search results to a user and allow the user to indicate the best result. The client device may report the test results to map service 1830 and/or other service(s) 1850 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of providing a sequence of turn-by-turn navigation instructions on a display screen of a device traversing a route, the method implemented using a computing device comprising one or more processors, the method comprising:
   presenting a first turn-by-turn navigation instruction for a first maneuver that occurs at a first location along the route in a first maneuver banner;
   presenting a current location of the device in a map region of the display screen;
   receiving a touch input through a touch input interface of the device on the first maneuver banner off the screen;
   in response to receiving the touch input, zooming out and rotating the map region proportionally to an amount of the maneuver banner sliding off the screen to display the current location, the first location, and a second location for a second maneuver along the route on the map region; and
   presenting a second turn-by-turn navigation instruction in a second maneuver banner for the second maneuver.

2. The method of claim 1, wherein the touch input corresponds to a swipe gesture on the device.

3. The method of claim 1, wherein the touch input corresponds to a swipe gesture on the device at a location of the first maneuver banner.

4. The method of claim 1, wherein the first turn-by-turn navigation instruction for the first maneuver is before the second turn-by-turn navigation instruction for the second maneuver in the sequence of turn-by-turn navigation instructions.

5. The method of claim 1, wherein the first turn-by-turn navigation instruction for the first maneuver is after the second turn-by-turn navigation instruction for the second maneuver in the sequence of turn-by-turn navigation instructions.

6. The method of claim 1, further comprising the act of replacing the presentation of the second turn-by-turn navigation instruction in the second maneuver banner with the display of the first turn-by-turn navigation instruction in the first maneuver banner after a predetermined period of time.

7. The method of claim 1, wherein the presentation of the second turn-by-turn navigation instruction in the second maneuver banner is replaced by the display of the first turn-by-turn navigation instruction in the first maneuver banner in response to a swipe gesture on the device.

8. The method of claim 1, further comprising the act of rotating the map region such that the first location and second location align vertically with respect to sides of the display screen.

9. The method of claim 1, wherein the map region is repositioned by rotating the map region.

10. The method of claim 1, further comprising:
    presenting a current location indicator indicating the current location of the device at a first position on the map region of the display screen; and in response to receiving the touch input, zooming out and rotating the map region proportionally to the touch input to display the current location, the first location, and the second location on the map region while maintaining the current location indicator at the first position on the map region of the display screen.

11. The method of claim 10, further comprising:
presenting the current location indicator in a first orientation on the map region of the display screen; and
in response to receiving the touch input, zooming out and rotating the map region proportionally to the touch input to display the current location, the first location, and the second location on the map region while maintaining the current location indicator at the first orientation on the map region of the display screen.

12. A non-transitory machine readable medium for storing a navigation application which when executed by at least one processing unit provides a sequence of turn-by-turn navigation instructions on a display screen of a device traversing a route, the navigation application comprising sets of instructions for:
displaying a first user interface (UI) item that describes a first turn-by-turn navigation instruction for a first navigation maneuver that occurs at a first location of the device along the route;
displaying a map region that presents the current location of the device as the device traverses a navigated route;
receiving a touch input on the first UI item;
in response to receiving the touch input, zooming out and rotating the map region proportionally to an amount of the maneuver banner sliding off the screen to display the current location, the first location, and a second location for a second maneuver along the route on the map region; and
presenting a second turn-by-turn navigation instruction in a second maneuver banner for the second maneuver.

13. The non-transitory machine readable medium of claim 12, wherein the touch input corresponds to a swipe gesture on the device at a location within the first UI item.

14. The non-transitory machine readable medium of claim 12, wherein the first turn-by-turn navigation instruction for the first maneuver is before the second turn-by-turn navigation instruction for the second maneuver in the sequence of turn-by-turn navigation instructions.

15. The non-transitory machine readable medium of claim 12, wherein the first turn-by-turn navigation instruction for the first maneuver is after the second turn-by-turn navigation instruction for the second maneuver in the sequence of turn-by-turn navigation instructions.

16. The non-transitory machine readable medium of claim 12, wherein the navigation application further comprises sets of instructions for replacing the second UI item with the first UI item after a predetermined period of time.

17. The non-transitory machine readable medium of claim 12, wherein the navigation application further comprises sets of instructions for replacing the second UI item with the first UI item in response to a swipe gesture on the device.

18. The non-transitory machine readable medium of claim 12, wherein the navigation application further comprises sets of instructions for rotating the map region such that the first location and second location align vertically with respect to sides of the display screen.

19. The non-transitory machine readable medium of claim 12, wherein the map region is repositioned by rotating the map region.

20. The non-transitory machine readable medium of claim 12, wherein the navigation application further comprises sets of instructions for:
presenting a current location indicator indicating the current location of the device at a first position on the map region of the display screen; and
in response to receiving the touch input, zooming out and rotating the map region proportionally to the touch input to display the current location, the first location, and the second location on the map region while maintaining the current location indicator at the first position on the map region of the display screen.

21. The non-transitory machine readable medium of claim 20, wherein the navigation application further comprises sets of instructions for:
presenting the current location indicator in a first orientation on the map region of the display screen; and
in response to receiving the touch input, zooming out and rotating the map region proportionally to the touch input to display the current location, the first location, and the second location on the map region while maintaining the current location indicator at the first orientation on the map region of the display screen.

* * * * *